US010013348B2

(12) United States Patent
Li et al.

(10) Patent No.: US 10,013,348 B2
(45) Date of Patent: Jul. 3, 2018

(54) PARALLEL MEMORY ALLOCATOR EMPLOYING LIVENESS METRICS

(71) Applicants: Pengcheng Li, Rochester, NY (US); Chen Ding, Pittsford, NY (US)

(72) Inventors: Pengcheng Li, Rochester, NY (US); Chen Ding, Pittsford, NY (US)

(73) Assignee: UNIVERSITY OF ROCHESTER, Rochester, NY (US)

( * ) Notice: Subject to any disclaimer, the term of this patent is extended or adjusted under 35 U.S.C. 154(b) by 343 days.

(21) Appl. No.: 14/850,474

(22) Filed: Sep. 10, 2015

(65) Prior Publication Data
US 2017/0075806 A1    Mar. 16, 2017

(51) Int. Cl.
*G06F 12/02*   (2006.01)
*G06F 3/06*    (2006.01)
*G06F 9/50*    (2006.01)

(52) U.S. Cl.
CPC ........ *G06F 12/0284* (2013.01); *G06F 3/0605* (2013.01); *G06F 3/0631* (2013.01); *G06F 3/0644* (2013.01); *G06F 9/5016* (2013.01); G06F 2212/1024 (2013.01); G06F 2212/1044 (2013.01)

(58) Field of Classification Search
CPC ..... G06F 2212/1044; G06F 2212/1024; G06F 9/5016; G06F 3/0644; G06F 3/0631; G06F 3/0605; G06F 12/0284
See application file for complete search history.

(56) References Cited

U.S. PATENT DOCUMENTS 6,505,229 B1 *  1/2003  Turner ................ G06F 9/3851
                                                  712/E9.053
2010/0114997 A1  5/2010  Micic et al.

OTHER PUBLICATIONS

PCT, International Search Report and Written Opinion, International Application No. PCT/US2016/050975, 14 pages, dated Nov. 28, 2016.
Berger, et al. "Hoard: a scalable memory allocator for multithreaded applications", In Proceedings of ASPLOS, pp. 117-128 (2000).
Google, TCMALLOC, online at https://github.com/gperftools/gperftools/blob/master/doc/tcmalloc.html (2007).
Lea, "A memory allocator", online at http://gee.cs.oswego.edu/dl/html/malloc.html (2000).

(Continued)

Primary Examiner — Larry T Mackall
(74) Attorney, Agent, or Firm — Thompson Hine LLP

(57) ABSTRACT

A liveness-based memory allocation module operating so that a program thread invoking the memory allocation module is provided with an allocation of memory including a reserve of free heap slots beyond the immediate requirements of the invoking thread. The module receives a parameter representing a thread execution window from an invoking thread; calculates a liveness metric based upon the parameter; calculates a reserve of memory to be passed to the invoking thread based upon the parameter; returns a block of memory corresponding to the calculated reserve of memory. Equations, algorithms, and sampling strategies for calculating liveness metrics are disclosed, as well as a method for adaptive control of the module to achieve a balance between memory efficiency and potential contention as specified by a single control parameter.

20 Claims, 15 Drawing Sheets

(56) References Cited

OTHER PUBLICATIONS

Wolfram Gloger, PTMALLOC3, online at https://github.com/emeryberger/Malloc-Implementations/tree/master/allocators/ptmalloc/ptmalloc3 (2006).

Li, et al. "All-window data liveness", In Proceedings of the ACM SIGPLAN Workshop on Memory Systems Performance and Correctness (2013).

Li, et al. "Modeling heap data growth using average liveness", In Proceedings of ISMM (2014).

Lee, et al. "Feedback directed optimization of tcmalloc", In Proceedings of the Workshop on Memory Systems Performance and Correctness (2014).

\* cited by examiner

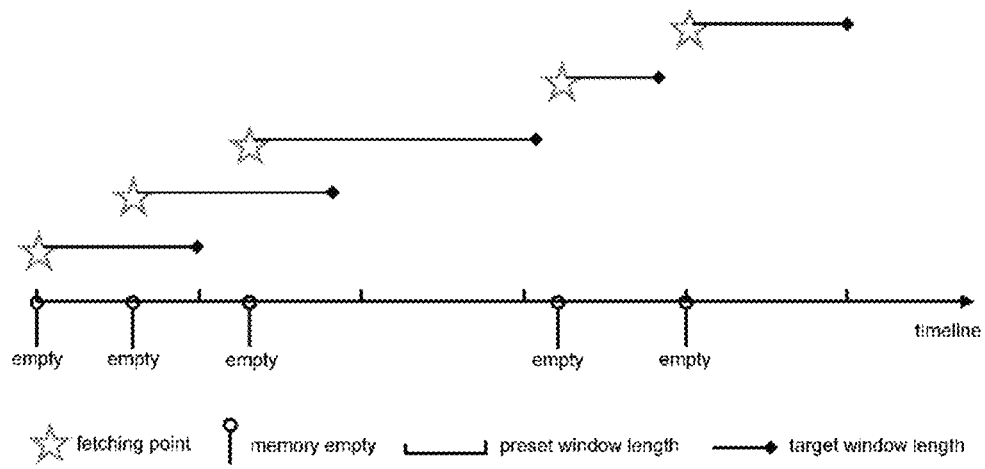
Fig. 6
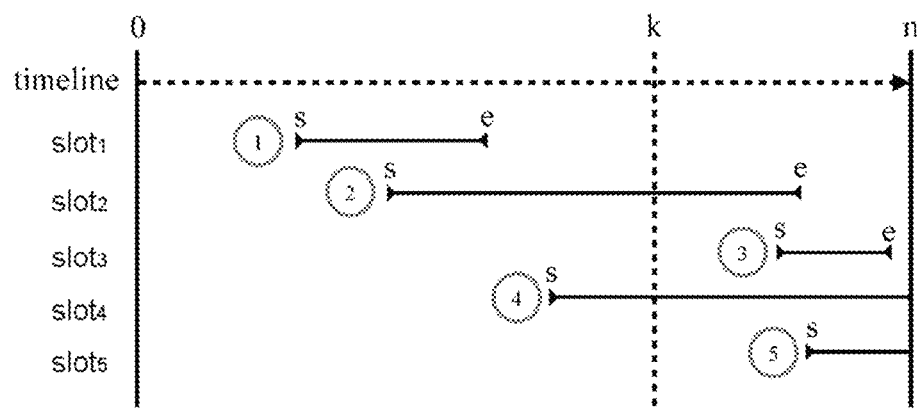
(a) example timeline of object allocations and deallocations
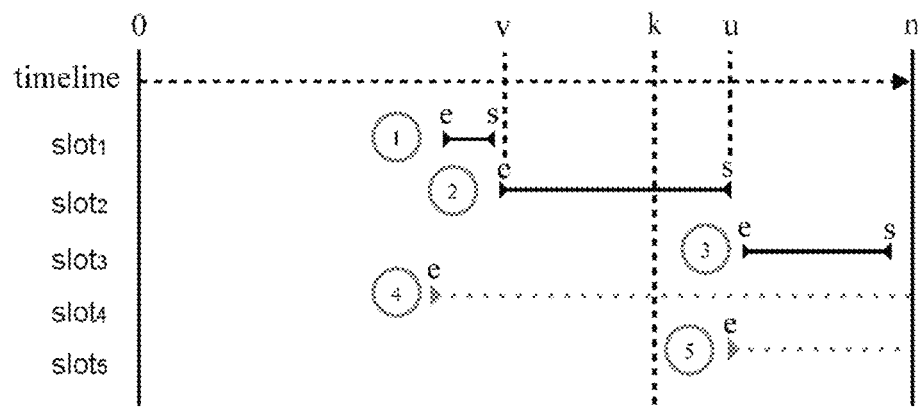
(b) example timeline of free interval existence and heap slot reuse
Fig. 7

| Benchmarks | | Total objects | Max objects in use | Total memory in bytes | Max memory bytes in use | Avg. object size(bytes) | Total / max |
|---|---|---|---|---|---|---|---|
| t-test1 | 1-TH | 5,407,871,972 | 550 | 28,957,915,488.6 | 3,024,016 | 5,354.77 | 9,575,979.59 |
| | 16-TH | 5,033,013,605 | 592 | 26,940,580,225,600 | 3,118,448 | 5,352.77 | 8,639,098.75 |
| t-test2 | 1-TH | 241,710,885 | 807 | 1,294,237,246,112 | 4,550,176 | 5,354.48 | 284,436.74 |
| | 16-TH | 241,749,923 | 826 | 1,294,524,983,008 | 4,582,656 | 5,354.81 | 282,483.56 |
| linux-scala. | 1-TH | 6,000,000 | 600,000 | 192,000,000 | 192,000,000 | 32 | 1 |
| | 16-TH | 96,000,000 | 80,352,493 | 3,072,000,000 | 2,571,284,032 | 32 | 1.19 |
| threadtest | 1-TH | 5,000,000,000 | 500,000 | 320,000,000,000 | 32,000,000 | 64 | 10,000 |
| | 16-TH | 5,000,000,000 | 422,352 | 320,000,000,000 | 31,095,712 | 64 | 10,290.81 |
| shbench | 1-TH | 3,231,100,000 | 153,960,005 | 183,756,800,000 | 8,813,425,904 | 56.87 | 20.85 |
| | 16-TH | 3,231,100,016 | 153,885,012 | 183,757,717,504 | 8,717,986,792 | 56.87 | 21.08 |
| larson | 1-TH | 145,112,458 | 1,033 | 1,279,995,330,856 | 9,764,080 | 8,820.71 | 131,092.26 |
| | 16-TH | 48,012,675 | 16,035 | 423,542,580,744 | 143,844,592 | 8,821.47 | 2,944.45 |

Table 3: The total size and maximal live size of memory allocation in the 6 test programs running with 1 thread and with 16 threads. The many differences between the programs show that they cover a wide range of memory allocation behavior.

Fig. 8

| Benchmarks | | $\frac{fetch}{alloc.+fetch}$ | $\frac{return}{free+return}$ | $\frac{fetch+return}{alloc.+fetch+free+return}$ | avg.fetch avg.alloc. | avg.return avg.free |
|---|---|---|---|---|---|---|
| t-test1 | Haswell | 0.26% | 0.09% | 0.18% | 182.34 | 186.65 |
| | Power8 | 0.16% | 0.04% | 0.10% | 114.29 | 81.63 |
| t-test2 | Haswell | 30.77% | 36.82% | 33.83% | 53.03 | 240.08 |
| | Power8 | 19.35% | 27.80% | 23.62% | 27.36 | 152.79 |
| linux-scala. | Haswell | 79.75% | 83.31% | 81.55% | 821.09 | 2841.39 |
| | Power8 | 70.56% | 76.40% | 73.29% | 503.46 | 1831.74 |
| threadtest | Haswell | 4.87% | 5.23% | 5.03% | 5264.82 | 7810.76 |
| | Power8 | 1.72% | 1.74% | 1.73% | 1809.99 | 2483.60 |
| shbench | Haswell | 13.74% | 16.44% | 15.05% | 88.59 | 141.34 |
| | Power8 | 9.06% | 14.48% | 11.76% | 55.27 | 120.74 |
| larson | Haswell | 47.16% | 57.71% | 52.83% | 71.63 | 342.83 |
| | Power8 | 24.91% | 36.67% | 31.07% | 31.78 | 173.86 |

Table 4: The time costs of fetch and return operations compared to allocation and free operations, counted by the total time in the first three data columns and the average time in the last two columns. The total cost is 30% or higher in 5 tests.

PARALLEL MEMORY ALLOCATOR EMPLOYING LIVENESS METRICS

STATEMENT REGARDING FEDERALLY SPONSORED RESEARCH

This invention was made with government support under CNS1319617, CCF1116104 and CCF0963759 awarded by the National Science Foundation. The government has certain rights in the invention.

TECHNICAL FIELD

The present disclosure relates to computer systems and, in particular, to a program memory allocation module for use in multiple-threaded programs to be run on multiple-core processing units and/or multi-processor computer systems.

BACKGROUND

Modern computer systems typically comprise at least one multiple-core central processing unit and, increasingly, at least one multiple-core graphics processing unit, with the latter being programmable to perform useful non-graphics tasks through heterogeneous computing frameworks such as CUDA and OpenCL. Due to the parallelism enabled by such systems, computer programs are increasingly designed to generate multiple program threads—ranging from a handful to thousands—in order to carry out sets of tasks which may be run relatively independently from one another and scheduled for concurrent execution. Examples of programs adopting multiple-threaded designs include web servers, databases, financial analytics applications, scientific and engineering analytics applications, and the like.

Specialized memory organization schemes can be useful in such systems since contention for access to the program heap can be so costly. Dynamic memory allocation can be one of the most ubiquitous operations in an application, with up to 30% of program execution time being spent in allocation and deallocation operations in certain benchmark applications. Frequent locking of the program heap during dynamic allocation operations also leads to poor scaling in multiple-threaded designs. Memory allocation modules focusing upon this problem generally use an organizational architecture pioneered by Hoard that provides a public, global memory heap for access by all threads as well as private, thread-local memory heaps for access by individual threads. [1] Thread-local memory heaps (each hereinafter a "local heap") are created to meet much of the program memory demand without requiring the use of memory locks or transactional memory mechanisms to protect a heap against modification by other concurrently-executing threads. The global memory heap (hereinafter a "global heap") is used to hold any global variables or large data structures as well as to provide a cache of memory allocatable for use in local heaps. Performance of the allocator can still be important since contention for operations involving the global heap—fetch operations requesting chunks of memory for local heaps and return operations releasing chunks of memory back to the global heap—will similarly delay the execution of allocator-invoking threads. As shown in FIG. 1, a thread must still invoke the allocator to transfer chunks of memory to and from the global heap, and the allocator must still use memory locks, transactional memory mechanisms, or the like in order to maintain coherency of the global heap while completing such transfer operations. Accordingly, contention for the allocator—or, more strictly speaking, contention for responses to requests relating to management of the global heap—remains a problem in such architectures. TCMalloc (thread-caching malloc) is a well-known example of an allocator using a Horde-like memory organization architecture. [2]

Memory allocation modules comprehensively addressing the problem of contention for the allocator are relatively unknown. In most existing allocators performance tuning is largely left to experts who devise default parameters based upon broad assumptions concerning program behavior and performance. For example, Doug Lea engineered his classic dlmalloc allocator so that "[if] configured using default settings [it] should perform well across a wide range of real loads." [3] dlmalloc allows those default settings to be modified via a mallopt call supporting programmer-specifiable parameters such as the size of an "arena" (the size of chunks of memory that are to be requested from the operating system for use by the program) and the size of an "arena cache" (the number of allocated-but-free chunks to be held for program reuse rather than immediate return to the operating system), but that capability is used infrequently and on an ad hoc basis. Due to the increasing importance of thread-level concurrency, various next-generation parallel memory allocators, some of which use sophisticated and highly tunable heuristics, are being developed. But these allocators tend to follow dlmalloc in pursuing uniform performance across wide ranges of loads. When the level of concurrency varies greatly, e.g., from a few threads to several hundred or more, there typically will not be a single set of parameters that consistently works well. Thus there is a need for a program memory allocation module which may be readily controlled based upon easily understood parameters.

SUMMARY

The present application discloses a tunable memory allocation module or "allocator" which employs a liveness metric. The allocator and metric enable tuning of memory efficiency versus potential contention for allocations from the global heap through the modification of a single control parameter. In general, the amount of memory fetched for a local heap should not be too high so as to have memory unused and wasted in multiple oversized local heaps, but not too low so as to require memory to be fetched too frequently from the global heap (increasing the likelihood and potential severity of inter-thread contention for response from the allocator). Liveness metrics enable the offline or online analysis of allocation behavior, as well as adaptive control of allocator performance through the single control parameter. The memory allocation module has been implemented and tested for both speed and memory efficiency. On the newest multicore machines from Intel and IBM, it is faster than state-of-art allocators by up to 17 times while using less memory and by up to 154 times when trading memory efficiency for speed.

In a first aspect, there is a non-transitory, computer readable storage medium encoding a memory allocation module. The memory allocation module includes instructions executable by a processor unit to perform: (1) receiving a parameter representing a length of a thread execution window for an invoking thread; (2) calculating a liveness metric for the invoking thread based upon the parameter; (3) calculating a reserve of memory to be provided to the invoking thread based upon the parameter; and (4) returning a pointer to an allocation of memory corresponding to the calculated reserve of memory, the allocation containing one or more chunks of memory that can be traversed via the pointer.

In a second aspect, there is a computer system comprising a processor unit, a memory for the storage of executable program code and data, and a memory allocation module stored within the memory for execution by the processor unit, the memory allocation module containing executable instructions to carry out: (1) receiving a parameter representing a thread execution window for an invoking thread; (2) calculating a liveness metric for the invoking thread based upon the parameter; (3) calculating a reserve of memory to be provided to the invoking thread based upon the parameter; and (4) returning a pointer to an allocation of memory corresponding to the calculated reserve of memory, the allocation containing one or more chunks of memory that can be traversed via the pointer. A third aspect, related to the first and second, is a method of managing a computer memory comprising corresponding steps.

In a fourth aspect, there is a method of adaptively controlling the memory allocation module or allocator. The method comprises: (1) setting the parameter equal to a target number of allocations to be satisfied between invocations of the memory allocation module to request memory for a thread; (2) invoking the memory allocation module to fetch an allocation of memory for the thread based upon the parameter; (3) setting the parameter equal to an adjusted number of allocations to be satisfied before a next fetch operation whereby, if correctly predictive of the number of allocations that will be satisfied by memory provided by the next fetch operation, a long term average number of allocations satisfied per fetch operation approaches the target number of allocations; and (4) reinvoking the memory allocation module to fetch an allocation of memory for the thread based upon the adjusted-number-of-allocations-valued parameter.

BRIEF SUMMARY OF THE FIGURES

FIG. 6 is a schematic diagram showing a simplified scenario for adaptive control of the allocator during the execution of a thread.

FIG. 7 is a schematic diagram depicting two scenarios related to the incremental calculation of liveness metrics, including (a) one in which objects occupy heap slots over intervals from s to e and (b) one in which free intervals are present between e and s.

FIG. 8 is a table showing the characteristics of multiple known allocation benchmark test programs when run with different numbers of concurrent threads.

FIG. 9 is a table showing the relative time spent in fetch and return operations involving the global heap in comparison to allocation and free operations involving local heaps for various benchmark tests.

DETAILED DESCRIPTION

Figure 1:
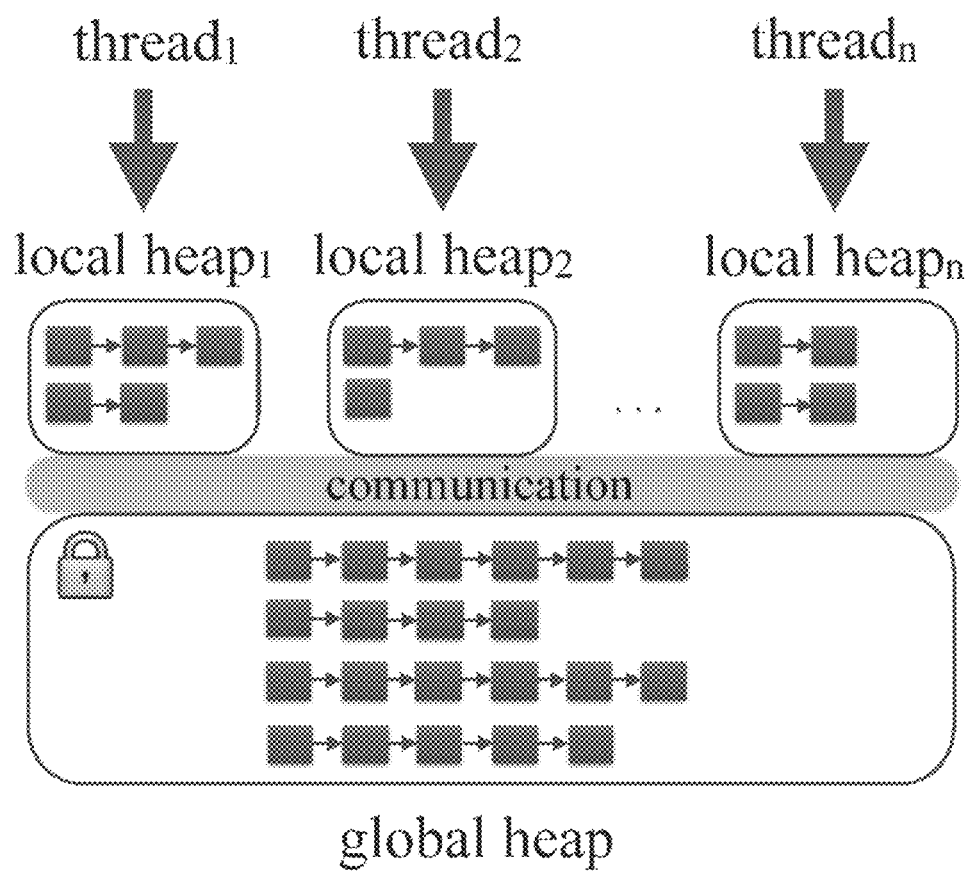
FIG. 1 is a schematic diagram showing a Hoard-like memory organization architecture. Memory protected by locks, transactional memory mechanisms, or the like is indicated with a padlock symbol.

Table 1 shows the performance of two benchmark programs, generating from 1 to 256 threads for concurrent execution, run on two different types of computer systems. The first is an Intel "Haswell"-based dual processor system capable of executing 72 simultaneous hardware threads. The second is an IBM Power8-based dual processor system capable of executing 160 simultaneous hardware threads. The benchmark programs apply Wolfram Gloger's multiple-threaded allocator performance tests to the TCMalloc allocator. [4] As more threads are used, program running time is initially reduced but eventually increases by up to two orders of magnitude. As discussed in greater detail below, despite the use of global and local heaps, a default-configured or singly-configured memory allocation module may exhibit pathologically bad performance in high concurrency workloads due to the computational cost of operations affecting the global heap. The global heap can be costly to access due to poor per-core and/or per-processor cache locality. Equally importantly, multi-threaded programs can create lock contention when multiple threads try to invoke fetch or return operations at the same time. The allocator must properly control all modifications to structures describing the global heap, e.g., block lists, free lists, and the like, in order to maintain the coherency of the global heap.

TABLE I

Benchmark testing of TCMalloc allocator with varying thread counts

| | | Total Execution Time for # of threads (in seconds) | | | |
|---|---|---|---|---|---|
| Benchmark | Platform | 1 thread | 16 threads | 64 threads | 256 threads |
| t-test1 | Haswell | 360 | 26.9 | 764 | 1078 |
| | Power8 | 377 | 30.5 | 7015 | >10800 |
| t-test2 | Haswell | 9.79 | 15.4 | 79.2 | 101 |
| | Power8 | 12.0 | 9.81 | 77.2 | 129 |

Disclosed herein is a set of metrics, indicative of "liveness," which may be used to derive the correct amount of memory to allocate during a fetch operation for a local heap. The allocation of a reserve of free heap slots to a local heap, beyond the immediate requirements of the invoking thread, allows for tuning of the frequency of fetch operations from the global heap. Parameterization by the length of an execution window between fetch operations, or an equivalent so-called "allocations per fetch (APF)" parameter, produces a multi-timescale metric and allows the performance of the module to be made fully tunable via this single control parameter.

In the following material, the execution of a thread will be discussed in terms of a series of memory allocation and deallocation events. A fetch is a request for additional memory for a local heap from the global heap. A return is a reclamation of memory from a local heap for return to the global heap. The unit of allocation and deallocation is an object, and the particular memory location holding an object is a heap slot. Heap slots holding an object are occupied, and heap slots available for allocation are free. Those of skill will recognize that objects typically have different sizes, that allocators conventionally employ a number of pre-defined size classes, and that each such size class may be viewed as a partition of the respective heap. Thus in allocators such as the present one global and local heaps each contain a collection of slots for each size class, and the global heap is accessed when a local heap fetches or returns memory in order to replenish or trim free heap slots of particular size class (excepting objects larger than a predetermined threshold size, which are usually allocated directly in the global heap).

For simplicity of description, the time associated with an event will be discussed in terms of a logical time based upon an allocation clock (AC) which only counts allocation events—deallocation events and other program activities do not advance or alter the allocation clock. A time window or time interval is consequently defined by starting and ending allocation events, and includes those events as well as all allocation events occurring in between them. The length of a particular window or interval is its end time minus its start time. Given an execution sequence, an AC assigns a logical time (AC time) as follows:

(1) at allocation events, the allocation clock is incremented, and the allocation event is assigned the new logical time; and (2) for all other events, e.g., frees, the event is assigned the current logical time; so that (3) there may be multiple events, e.g., an allocation and subsequent free, that are assigned the same logical time.

Thus if a time window is specified by two AC times $w_s$ (window logical start time) and $w_e$ (window logical end time), that window includes all the events from the $w_s$th allocation to the last event before the $(w_e+1)$th allocation. Those of skill in the art will recognize that other logical times, such as a heap-activity clock which counts both allocation and deallocation events, or even physical times, such those reported by a cycle timer, high precision real-time clock interface, or the like, could be used with appropriate adjustments to the disclosed equations and concepts. However, program behaviors in the same physical time period may not be deterministic in different runs of even the same program using the same inputs, and logical times are also useful for two reasons: first, for machine independence, and second, for ease of understanding program execution in terms of program events. Physical times may of course be used when comparing the real-world performance of a program between different instances of program execution or between execution upon different computer architectures.

Figure 2:
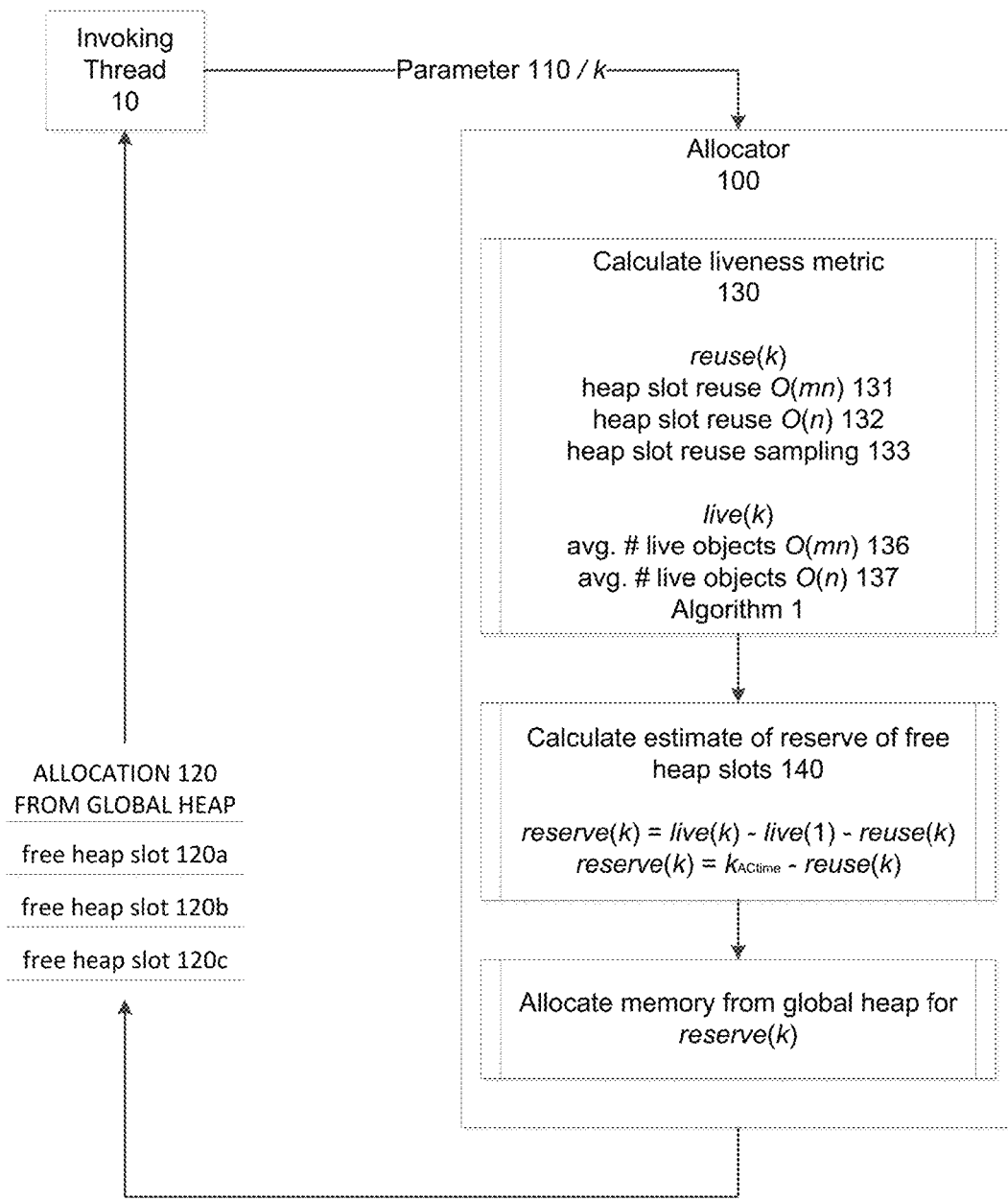
FIG. 2 is a schematic diagram illustrating the principal inputs, functions, and outputs of the allocator.

With reference to FIG. 2, in general, the disclosed program memory allocation module or allocator 100 takes a parameter 110, designated as k, which represents the length of a thread execution window between fetch operations, i.e., a number of thread-local allocation events per fetch. Based upon that parameter the allocator 100 seeks to provide a memory allocation 120 having a sufficient number of free heap slots 120a, 120b, 120c, etc. to preclude the need for an invoking thread 10 to re-invoke the allocator to obtain additional memory (to carry out another fetch) within that thread execution window. To do this, the allocator 100 calculates one or more liveness metrics 130, comprising measures of heap slot reuse 131, 132 and/or number of live objects 136, 137 within an average window of length k, as well as an estimate of a reserve of free heap slots 140 sufficient to meet requirements for another average windows of length k. The liveness metrics and reserve calculation are described below for an exemplary scenario in which all heap objects have the same size class. However, it will be appreciated (as suggested earlier) that the program, heaps, and allocator 100 will usually employ more than one size class. Liveness metrics 130 and the estimate of reserve 140 thus may be calculated separately for each size class, with k representing a window for events relating to objects of that particular size class. The liveness metrics 130 and estimate of reserve 140 are multi-timescale calculations defined for ks up to and including the entire length of execution n, and can be calculated in terms of AC time in order to allow for mathematical simplification.

Figure 3:
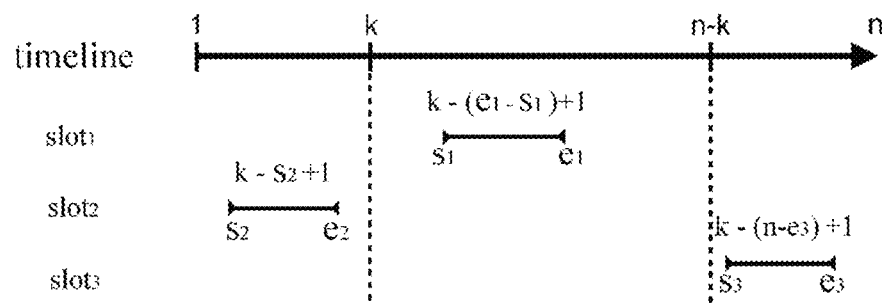
FIG. 3 is a schematic diagram showing a simplified scenario for calculation of the liveness metric of average heap slot reuse.

The principal liveness metric is heap slot reuse 131 or reuse(k), i.e., for a time window of length k in the invoking thread, the number of times that heap slots which were holding live objects at the start of the window were freed and then allocated to hold new objects within that window. The number of reuses will change from particular window to particular window during execution, so that a useful metric measures an average across multiple possible windows of length k, not merely reuse within one particular window. For an execution history with n allocation events, the number of possible windows of all lengths $(1 \le k \le n)$ is $\binom{n}{2}$ or $n(n+1)/2$. A comprehensive metric could use all possible windows. A metric for a burst-sampled or rolling-window period of time could use all possible windows within that period. Rather than counting reuses window by window, it is more tractable to identify free intervals, i.e., intervals during which a heap slot is free, unallocated, and unoccupied, and then to count the number possible windows of length k which encompass such intervals. Over the course of an execution one may identify m free intervals (m free intervals among all heap slots existing anytime between initiation of the thread and current logical time n). In any particular window w $([w_s, w_e])$, counting the number of intra-window reuses is the same as counting the number of free intervals described by pairs $s_i$ (interval logical start time) and $e_i$ (interval logical end time) which fall completely inside the window, i.e., i $([s_i, e_i])$ where $w_s \le s_i \le e_i \le w_e$. As shown in FIG. 3, a heap slot $slot_1$ may be occupied at logical time 1, freed at logical time $s_1$ and reoccupied at logical time $e_1$. Similarly, heap slots $slot_2$ and $slot_3$ are both shown as having free intervals. Counting the number of windows which enclose each free interval will yield the same count, but can be calculated even more readily. Thus an average heap slot reuse 131 may be calculated via $$\text{reuse}(k) = \frac{\Sigma_{all\ windows\ w}(\text{number of free intervals in } w)}{n - k + 1} \quad \text{Eq. (1)}$$

$$= \frac{\Sigma_{all\ intervals\ i, e_i - s_i \le k}(\text{windows } w \text{ enclosing } i)}{n - k + 1}$$

$$= \frac{\sum_{i=1}^{m} I(e_i - s_i \le k)(\min(n-k, s_i) - \max(k, e_i) + k + 1)}{n-k+1}$$

where function I is a predicate equal to 1 if the condition $(e_i - s_i \le k)$ is true or else 0.

The predicate function I causes the counting only of free intervals not longer than k. Equation 1 has a quadratic cost, taking O(m) time to compute for each k and O(mn) time to compute for all possible ks (k≤n).

Equation 1 can converted to calculate reuse(k) in linear time for each thread. Heap slot reuse 132 or reuse(k) can be calculated via the equation set $$\text{reuse}(k) = \frac{X(k) - Y(k) + Z(k)}{n-k+1} \quad \text{Eq. (2a)}$$

$$X(1) = \sum_{i=1}^{m} I(e_i - s_i = 1)s_i \quad \text{Eq. (2b)}$$
$$X(k) = X(k-1) - \sum_{i=1}^{m} I(s_i \ge n - (k-1)) +$$
$$\sum_{i=1}^{m} I(e_i - s_i = k)\min(n-k, s_i), \text{ for } k > 1$$

where function I is a predicate equal to 1 if the indicated condition is true or else 0.

$$Y(1) = \sum_{i=1}^{m} I(e_i - s_i = 1)e_i \quad \text{Eq. (2c)}$$

$$Y(k) = Y(k-1) - \sum_{i=1}^{m} I(e_i - s_i = k-1) + \sum_{i=1}^{m} I(e_i - s_i = k)\max(k, e_i), \text{ for } k > 1$$

where function I is a predicate equal to 1 if the indicated condition is true or else 0.

$$Z(1) = 2\sum_{i=1}^{m} I(e_i - s_i = 1) \quad \text{Eq. (2d)}$$

$$Z(k) = Z(k-1) + \sum_{i=1}^{m} I(e_i - s_i \le k) + k\sum_{i=1}^{m} I(e_i - s_i = k), \text{ for } k > 1$$

where function I is a predicate equal to 1 if the indicated condition is true or else 0.
X(k), Y(k), and Z(k) are recursive equations. Because X(k), Y(k), and Z(k) all take O(n) time to compute for all possible ks, reuse(k) can be also be computed in O(n) time Another liveness metric is the average number of "live" objects in the thread-local heap 136 or live(k), i.e., a population count of all objects existing at any time within a window of length k, averaged over all such possible windows. Such a metric has been previously developed by Li et al. [5, 6] The Li et al. metric may be determined via $$\text{live}(k) = \frac{\sum_{all\ windows\ w}(\text{number of live objects in } w)}{n-k+1} \quad \text{Eq. (3)}$$
$$= \frac{\sum_{all\ objects\ A} \text{contribution}(A)}{n-k+1}$$
$$= \frac{\sum_{i=1}^{m}(\min(n-k+1, e_i) - \max(k, s_i) + k)}{n-k+1}$$
$$= \frac{\sum_{i=1}^{m} \min(n-k+1, e_i) - \sum_{i=1}^{m} \max(k, s_i) + mk}{n-k+1}$$

However, this equation again has a quadratic cost, taking O(m) time to compute for each k and O(mn) time for all possible ks (k≤n).

Equation 3 can be converted to calculate live(k) in linear time. The average number of "live" objects in the heap 137 or live(k) can be calculated via the equation set $$\text{cumu\_allocations}(k) = \sum_{i=1}^{m} I(s_i \le k) \quad \text{Eq. (4a)}$$

$$\text{cumu\_deallocations}(k) = \sum_{i=1}^{m} I(e_i \ge k) \quad \text{Eq. (4b)}$$

$$\text{live}(1) = \frac{\sum_{i=1}^{m} e_i - \sum_{i=1}^{m} s_i + m}{n} \quad \text{Eq. (4c)}$$

$$\text{live}(k > 1) = \frac{n \times \text{live}(1)}{n-k+1} - \frac{\text{cumu\_deallocations}(n-k+2) + \text{cumu\_allocations}(k-1)}{n-k+1}$$

live(k) in this form is a recursive equation. Because cumulative allocations and deallocations can be computed in O(m) time and live(k) can be computed in O(n) time, the metric can be calculated in linear time.

An estimate of the reserve of free heap slots to provide to a local heap 140 or reserve(k) is also calculable based upon the parameter 110 or k. The correct reserve is the minimal sufficient number of free heap slots at the beginning of a window which will satisfy new allocation demand for heap slots during the window, that is, a quantity intended to be just enough to avoid having to once again fetch memory for heap slots during execution within the window. If thread execution is expected only to de-allocate or only to allocate through heap slot reuse, the correct reserve is 0. reserve(k) is a prospective estimate equal to a historical average for all possible windows of length k. Thus reserve(k) may be calculated using the reuse(k) and live(k) metrics. The amount of new allocation or memory demand in a representative window of length k is the total population of objects during the window minus the population of objects at the start of the window, i.e., live(k)–live(1). During execution some objects may be freed and their formerly occupied heap slots reused to hold new allocations. This reuse is available to meet a portion of the new memory demand, and accordingly the reserve should meet the otherwise unmatched local memory demand. In short, $$\text{reserve}(k) = \text{live}(k) - \text{live}(1) - \text{reuse}(k) \quad \text{Eq. (5)}$$

In Equation 5 the parameter k can be the time from any type of clock, physical or logical. But by using an allocation clock and AC time, the first two terms may be directly replaced by the parameter 110 or k specifying a window in AC time, as well be explained later, by a target number of allocations per fetch (APF). Since the length of such a window is, by definition, the number of allocation events occurring in the window, k=live(k)–live(1) under these conditions. Thus equation 5 simplifies to $$\text{reserve}(k) = k - \text{reuse}(k) \quad \text{Eq. (6)}$$

where k is valued in AC time.

The program memory allocation module or allocator 100 performs a fetch of reserve(k) free slots, i.e., allocates memory from the global heap for use by the allocator-invoking thread 10, returning a pointer to an allocation of memory corresponding to the calculated reserve of memory. The allocation could be to a continuous chunk of memory for management by the thread, or could be a data structure such as a linked list including one or more chunks of memory and additional pointers linking the constituent chunks. During allocation from the global heap, the allocator 100 uses memory locks, transactional memory mechanisms, or the like to maintain the coherency of the global heap, management lists, and the like. The present allocator 100 does not negate this problem in comparison prior allocators, instead, it permits single-parameter tuning and, optionally, adaptive control to substantially reduce the effect of this second problem upon program performance. In short, the parameter 110 or k establishes an expected communication frequency for fetch operations between an individual thread and the global heap, ranging from a value of 1 (one allocation event per fetch; as if, barring reuse, one free heap slot were to be fetched from the global heap during each allocation event) to n (all expected allocation events to be served by a single fetch operation; as if, barring reuse, all free heap slots needed were to be fetched from the global heap upon the creation of the thread).

Performance of the present allocator 100 embodies a time-space tradeoff. If a program spends more time in the allocator, it can make more compact use of program memory. Communication frequency between a thread heap and the global heap, and the total number of communication operations by all threads, is an effective proxy for time spent in the allocator. Memory efficiency may be quantified by the amount of unused memory in local heaps. At each allocation by a thread, unused memory may be counted by the number of free slots of each size class in the local heap. In one case it may be desired to count not the total number of free slots in the entire local heap but instead only the free slots in the size class of an allocation. As a result, the measure of memory inefficiency becomes activity based, and the relative importance of a size class weighted by the frequency of its use. If a particular size class is the one most frequently used, the number of free slots of that size class has the most weight in a measure of memory inefficiency. Under such a measure, one cannot gain significant efficiency by reducing free space in local heap slots of a size class that sees little allocation, but must instead optimize memory usage in the most frequently used size classes.

In practice, the parameter 110 or k has the following three purposes:
(1) Offline and online analysis. The estimate of reserve can be predicted by offline profiling before a new execution or by online profiling during a new execution.
(2) Single-parameter control. An allocator can be controlled to fetch memory more or less frequently by altering the parameter 110 or k. The allocator 100, based upon the parameter 110, would then seek to provide just the right amount of reserve so that fetches occur once every k allocation events (on average).
(3) Adaptive implementation. The liveness metrics and estimate of reserve are average values. To handle deviation, different ks may be specified dynamically to trend toward a preset average interval $P_w$ between fetch events.

Offline Analysis and Optimal Solution

An exemplary offline analysis and optimization will be discussed for a program performing allocations and deallocations of objects of a single size class within a single thread. Where the number of live objects in the local heap is known at each point in time and m number of transfers will be allowed between the global heap and local heap, including both fetches and returns, what is the lowest possible memory inefficiency in the local heap? Here a fetch may happen at any time, not just upon an allocation when the local heap free list is empty. For a thread execution of length n there are $\binom{n}{m}$ ways to place m such transfer operations. For each choice, there are $2^m$ cases since each transfer operation could be either a fetch or a return. For each transfer operation, the maximal volume to transfer is n. Hence, a brute force solution needs to evaluate $O(\binom{n}{m} \times 2^m \times n)$ choices.

Figure 4:
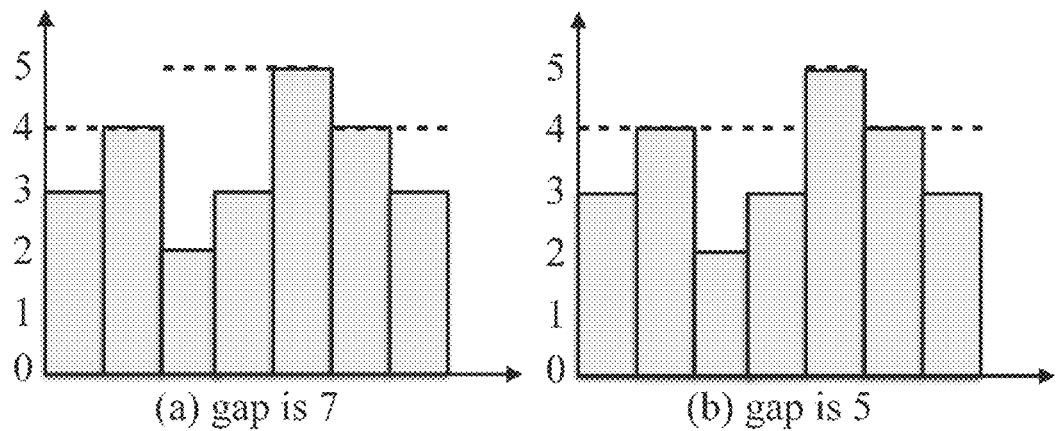
FIG. 4 depicts two alternate scenarios (a) and (b) for scheduling fetch and return operations, with activity represented in terms of a bar graph of live objects occupying slots in the local heap.

FIG. 4 is a representation of the problem in terms of a bar graph and two alternate transfer operation scenarios. Bar height represents the number of live objects at a point in time, the sequence of bars represents a sequence of allocation and deallocation events from left to right, and the total number of bars represent an execution of length n. The segments or roofs covering the bars represent transfer operations and communication with the global heap, i.e., fetch and return operations. If a roof is higher than the previous one (or is the first one), the transfer operation is a fetch. If a roof is lower than the previous one, the transfer operation is a return. The height difference is the volume to transfer. The goal is to minimize the gap between roofs and bars for m possible transfers covering all n bars. In FIG. 4 there are m=3 roofs and n=7 bars. Scenarios (a) and (b) illustrate two alternate placements of roofs representing alternate possible times, types, and volumes of transfer, with gaps of 7 and 5, respectively. Thus the placements in scenario (b) are better (more memory efficient) than those in scenario (a).

In terms of the representation, the optimal substructure of the optimization problem is $$\text{minGap}(m,n) = \min_{i=m-1 \ldots n-1} \{\text{minGap}(m-1,i) + \text{oneRoofGap}(i+1,n)\} \quad \text{Eq. (7)}$$

where minGap(m,n) calculates the minimal gap value of using m roofs to cover bars from 1 to n and oneRoofGap(i,j) calculates the gap value of using one roof to cover bars from i to j. One may analyze the placement of the last roof, whose leftmost point must fall between bar m (since we have assumed m roofs or transfers) and bar n, and select the minimal gap among all results for this range of roofs. For oneRoofGap(i; j), this will be the height of the highest bar from bar i to bar j. One may then repeat the analysis for a lesser number of roofs to cover bars from 1 to i (the leftmost point of the last roof). A C language implementation of the optimal solution is included in Appendix A.

The dynamic algorithm for determining the optimal solution is executable in $O(n^3)$ time, and thus can be used for, but is not strictly limited to, offline analysis of program execution. By performing the analysis for different assumed values of m, i.e., differing numbers of transfer operations involving the global heap, it becomes possible to time transfers by modifying the logical timing of events within a program as well as to determine an upper bound to the performance achievable by manual tuning or adaptive control.

Single Parameter Control and Adaptive Control Algorithm

As detailed above, the memory allocation module or allocator 100 takes a parameter 110 or k for each size class of object. Again, the present description will focus upon analysis and control of the module 100 for one size class of object, but it will be appreciated that parameter 110 will be usually be specified and allocator behavior usually tuned separately for each such size class. "k" represents the length of an execution window or, in terms of a control algorithm, a sought-after number of allocation events to be satisfied by the fetch operation—"allocations per fetch" or APF. A thread 10 must invoke the allocator 100 upon an allocation event where there are no free local heap slots available to satisfy the allocation, and this requirement may be usefully integrated into a single-parameter-based, adaptive control algorithm for tuning the frequency of fetches from the global heap, and thus time spent in the allocator as well as the risk of contention for responses from the allocator.

Figure 5:
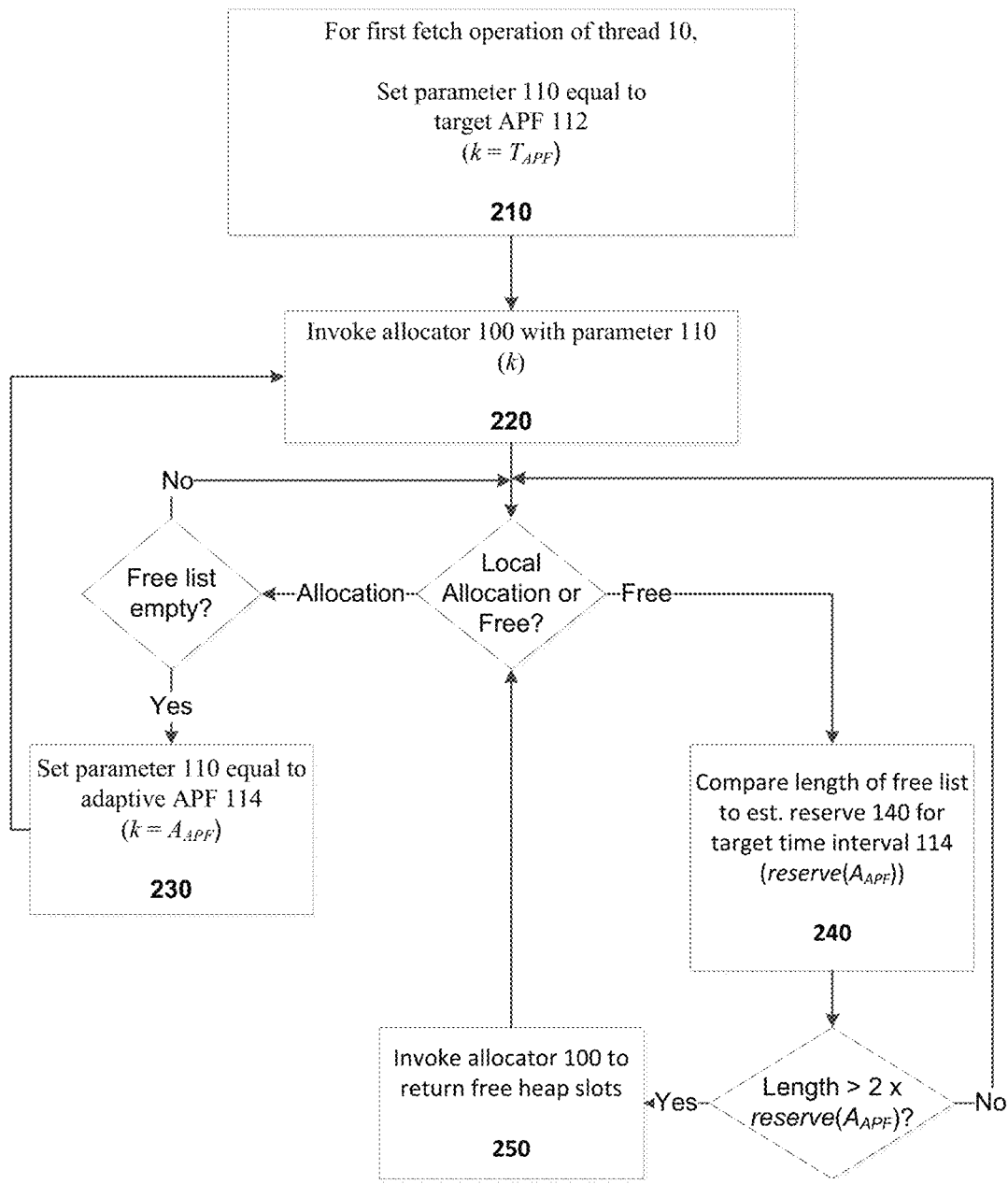
FIG. 5 is a flowchart of a method for adaptive control of the allocator.

FIG. 5 illustrates an adaptive control algorithm 200 for operation of the allocator 100. For the first fetch operation of a thread (step 210), k is set equal to a target number of allocations per fetch 112 or $T_{APF}$, representing a predetermined target number of allocations, on average, to be satisfied by memory provided by the next fetch operation. As otherwise shown in FIG. 2, the allocator 100 is invoked (step 220) to fetch a memory allocation 120 for a new heap slot 120a and an additional reserve of free heap slots 120b, 120c, etc. (altogether totaling reserve(k) slots) based upon the parameter 110. That allocation 120 is provided to the allocator-invoking thread 10 and its associated local heap for private use by the thread. Returning to FIG. 6, execution of the thread may continue until the reserve of free slots is exhausted and an additional allocation is needed, triggering a subsequent fetch operation. Subsequent fetch operations may happen after a greater or lesser number of allocation events than $T_{APF}$ for many reasons. If using online analysis, we do not yet have a well-characterized reserve(k) since there are such a small number of possible windows contributing to the calculation of liveness metrics 131-137 and the estimate of reserve 140. A more common reason is that reserve(k=$T_{APF}$) is an average reserve, which may not be the actual reserve needed for the next series of allocations due to variability in heap slot reuse. Furthermore, equations 5 and 6 assume that the frees identified in reuse(k) happen before any new allocations where to-be-freed slots might be used. For these reasons, the subsequent fetch operation may happen sooner or later than the end of the time interval represented by $T_{APF}$ number of allocation events.

Consequently for subsequent fetch operations for a thread (step 230) the parameter 110 (or k) is set equal to an adaptive number allocations per fetch 114 or $A_{APF}$, representing an adjusted number of allocations, on average, to be satisfied by the next fetch operation. The adaptive allocations per fetch 114 is computed based upon execution history so that a long term average time interval between fetch operations approaches and ideally becomes equal to the target allocations per fetch 112. In particular, by tracking the current time 116 or n (in AC time, as explained above), and the number of fetches performed by the thread since the start of execution 118 or c, the adaptive allocations per fetch 114 may be specified as:

$$A_{APF} = T_{APF} * (c+1) - n \quad \text{Equation (8)}$$

where $A_{APF} = T_{APF}$ if $T_{APF}*(c+1)-n \leq 0$

Thus, as shown in FIG. 6 on the leftmost end, if a thread invokes the allocator 100 for a first fetch and exhausts its reserve of free slots 120b, 120c, etc. before the target number of allocations per fetch 112, the adaptive number of allocations per fetch 114 will become larger than $T_{APF}$ and the parameter 110 or k provided to the allocator 100 set to a longer execution window (allocations per fetch and the length of an execution window being equivalent in this context). This will tend to increase the size of the allocation 120 and the reserve of free heap slots provided by the fetch operation. Conversely, if a thread had requested a first fetch and exhausted its reserve of free slots only after the target number of allocations per fetch 112, the adaptive number of allocations per fetch 114 would become smaller than $T_{APF}$ and the parameter 110 or k provided to the allocator set to a shorter execution window. This would tend to decrease the size of the allocation 120 and the reserve of free slots provided by the fetch operation. Over multiple fetch events, proceeding from leftmost end to rightmost end of the figure, adaptive control using larger and smaller adaptive allocations per fetch 114 seeks to produce a long term average number of allocations per fetch equal to that specified in the predetermined target allocations per fetch 112. As shown in FIG. 6 on the rightmost end, a fifth fetching point 150 occurs at the end of a fourth interval of length $T_{APF}$ (n=$T_{APF}$×4). At the fifth fetching point, four fetches have been performed since the start of execution (c=4) so that the right half of Equation 8 is $T_{APF}$×(4+1)−$T_{APF}$×4 or, simply, $T_{APF}$— the target number of allocations per fetch and desired pace of the long term average. At each such fetching point, the allocator 100 is invoked (returning to step 220) to fetch a further memory allocation 120 (altogether totaling reserve(k) slots) based upon the adaptive-allocations-per-fetch-valued parameter 110 (k=$A_{APF}$).

A return event may be triggered by the thread once its associated local heap passes a predetermined threshold of free heap slots. For example, upon an local free operation (step 240) the thread may compare the length of the free list to the estimated reserve 140 for the adaptive allocations per fetch 114 specified time interval. If the free list is equal to 2×reserve($A_{APF}$)+1, i.e., greater than twice the estimated reserve, the thread may invoke the allocator 100 to return free heap slots to the global heap (step 250), e.g., reserve ($A_{APF}$)+1 slots. If not, the free operation simply finishes. Other conditions and other return sizes may be used, but the preferred result is to leave the local heap with at least reserve($A_{APF}$) free heap slots so as not to accelerate potential need for a subsequent fetch while maintaining a reasonable degree of memory efficiency. It will be appreciated that even though steps 240 and 250 are illustrated as following step 230, the check step 240 could be performed for any free occurring after an initial invocation of the allocator 100 (first performance of step 220) by a thread.

Online Analysis

Equation sets 2a-2d and 4a-4c can be computed in linear time in an offline analysis performed after the end of an execution. If the metrics were to be calculated periodically during execution, even the linear-time offline complexity of metrics 132 and 137 would become quadratic-time online complexity due to the calculation of live(n,k) and reuse(n,k) where n is the current time of execution. Thus heap slot reuse 131-132 and number of live objects 136-137 are suitable for use with single parameter adaptive control when implemented using values pre-calculated for possible ks, but far less suitable for online analysis and adaptive control of the allocator 100 during program execution. Rather than directly calculating reuse(k) and live(k) based upon those equations and parameter 110, the adaptive control algorithm 200 and allocator 100 could select pre-calculated values, determined via an analysis of prior instances (one or more) of program execution, based upon parameter 110. The set of pre-calculated values would most likely be stored within a configuration file accompanying the program and allocator 100, but could alternately be stored within the program, passed to the program as an external parameter, etc.

Even though subsequent executions of a program might be thought to be reasonably similar, differences in program inputs and differences in program behavior stemming from different conditions encountered at different times could produce markedly different behaviors. Online analysis for single parameter adaptive control requires periodic calculation of liveness metrics during execution in order to tune the allocator using the most relevant historical information available—that collectable from the current program execution itself. The following equation allows for an incremental analysis of liveness which is computable in O(1) time at each program point and in O(1) time whenever heap slot reuse or number of live objects is calculated for a given value of the parameter 110 or k.

$$\text{live}(n, k) = \frac{\sum_{i=1}^{m} I(e_i \leq n - k + 1) + \sum_{i=1}^{m} I(e_i > n - k + 1)(n - k + 1)}{n - k + 1} - \frac{\sum_{i=1}^{m} I(s_i \leq k)k + \sum_{i=1}^{m} I(s_i > k)s_i}{n - k + 1} + \frac{mk}{n - k + 1}$$

$$= \frac{\Sigma e_{n-k+1} + (m - \#e_{n-k+1})(n - k + 1) - (\#s_k k - \Sigma s_n - \Sigma s_k) + mk}{n - k + 1}$$

Eq. (9)

where $\Sigma e_k$ is the sum of free times before time k, $\#e_k$ is the number of frees before time k, $\Sigma s_k$ is the sum of allocation times before k, and $\#s_k$ is the number of allocations before time k, and m is the number of currently allocated objects at time n.

$\Sigma e_k$, $\#e_k$, $\Sigma s_k$, and $\#s_k$ can be incrementally accumulated in O(1) time, therefore, given n and k, live(n,k) can be computed in O(1) time and is linear in real time. Space complexity will be O(n), where n is the total time of execution. In terms of an algorithm, equation 9 may be implemented as follows:

procedure *doAllocation*

01: $\Sigma s_n \mathrel{+}= n$

02: $\#s_n \mathrel{+}= 1$

03: $m \mathrel{+}= 1$ procedure *incTimer*

04: $n \mathrel{+}= 1$

05: $\#s_n = \#s_{n-1}$

06: $\Sigma s_n = \Sigma s_{n-1}$

07: $\#e_n = \#e_{n-1}$

08: $\Sigma e_n = \Sigma e_{n-1}$ procedure *doFree*

09: $\Sigma e_n \mathrel{+}= n$

10: $\#e_n \mathrel{+}= 1$ procedure *live(n, k)*

11: $i = n - k + 1$

12: $tmp_1 = (m - \#e_i) \times i + \Sigma e_i$

13: $tmp_2 = \#s_k \times k + \Sigma s_n - \Sigma s_k$

14: return $\dfrac{(tmp_1 - tmp_2 + m \times k)}{n - k + 1}$ where doAllocation and then incTimer are called during each allocation event, doFree is called during each free event, and live(n,k) is called upon invocation of the allocator 100 to perform a fetch operation. As indicated in the end of the prior section, live(n,k) may also be called during a free operation to determine whether to perform a return.

FIG. 7 illustrates all five potential cases encountered when calculating all-window object liveness and heap slot reuse. The current time is n when the number of live objects and reused heap slots is calculated for a window of length k. At time n of scenario (a), objects which occupied slots 1, 2, and 3 (from s to e) are dead while objects occupying slots 4 and 5 are not. At time n of scenario (b), free intervals in slots 1, 2 and 3 (from e to s) have ended due to reuse while free intervals in slots 4 and 5 have not (meaning that there are two available heap slots for reuse at time k). For consistency in explanation we will assume that that the lengths of all five free intervals will be less than k. Different assumptions must be made for objects and reuses when they are not dead (objects) or not accomplished (reuses) before or at time n. Because the number of "live" objects 138 counts how many objects are alive at any time within a window, objects 4 and 5 (scenario (a)) should be included. The death times for objects 4 and 5 may be assumed to be n since, even if they live longer, an assumed death time does not impact the calculation made at n. However, heap slot reuses not actually accomplished before or at time n cannot be assumed to have been accomplished as of time n. They should not be counted in a computation of heap reuse at time n because one does not know at n whether a reuse will actually be accomplished after time n. Thus it is possible to incrementally calculate live(k) but not, strictly speaking, reuse(k). For example, in FIG. 7 scenario (b), at time point k (here referring to the time, not a window of length k) reuses of heap slots 2 and 4 have not yet been accomplished, and they cannot be counted in an accumulation of meta data because one does not know if they will be accomplished before the next fetch operation. An incremental analysis cannot know that reuse of heap slot 2 is accomplished until time u. Because u is before n, such an instance of reuse should be counted in heap slot reuse before the next fetch. To do that, the algorithm would have to go back to update meta data of time points between u and v at latest at time n, which is not an O(1) updating process. To be O(1), the update of meta data at time k would have to be "aware of the future," which is not possible. Instead, online analysis for reuse(k) may be performed using bursty heap slot reuse sampling 133.

In bursty sampling, an execution is periodically analyzed for a period, called a burst, and every two consecutive bursts are separated by a hibernation period. [1, 5] The algorithm may use bursty sampling to measure heap slot reuse as follows:

(1) During a burst, collect all free intervals;
  (2) Pre-calculate a heap slot reuse for windows of all ks using Equation (1) or, preferably, Equation set 2a-2d;
  (3) Store the set of pre-calculated reuse(k) values for use by the adaptive control algorithm 200 and allocator 100 during execution through the hibernation period and next burst period, i.e., use a set of quasi-pre-calculated reuse(k) values until completion of the next burst. Although the equation set 2a-2d is calculated in linear time, the amortized time complexity is O(1) in the sampled time period and the overall cost may be controlled by predetermining the relative lengths of the burst and hibernation periods used in the sampling procedure.

Experimental Implementation and Observed Results

To evaluate how the frequency of transfer operations affects the performance of concurrent memory allocation, how tunable the performance of the allocator 100 is, and how performance and tenability of the allocator compares with an optimal solution, the allocator was implemented as a modification of an existing implementation of TCMalloc. TCMalloc ordinarily includes parameterized thresholds including batch size, max thread cache size, and max size-class free list length, using complex heuristics carried out at runtime to adjust the default or user-specified thresholds. In allocator 100, named live in the tables and figures referenced below, all of the thresholds and heuristics used for local heap management were replaced with liveness-based allocation. For reproducible results, the allocator 100 used offline analysis, and for each of the tests the program was run to first permit offline analysis/profiling of reserve (k), then run again to test performance versus TCMalloc, Hoard, and PTMalloc-v3. [7] Online analysis would not have added significant cost when used with O(1) algorithms and bursty sampling such as described in the previous section.

It is common to use synthetic benchmarks to evaluate a memory allocator since they are specially designed to represent common allocation patterns in real applications. Six such tests were used: t-test1 and t-test2 from PTMalloc, and Larson, threadtest, shbench, and linux-scalability from Hoard. [1, 7] In linux-scalability, every thread keeps allocating iteration-count same-size objects and then frees them once. In threadtest, every thread periodically allocates numObjs same-size objects and frees them. In larson, every thread has chperthread slots. Each time, a thread randomly picks one victim slot, frees it and allocates one object with a random size in it. The total free size and the total allocated size are not necessarily the same. In t-test1, every thread performs a couple of rounds of malloc test, during each of which a thread frees actions objects and allocates actions objects with random sizes. t-test2 differs with t-test1 in that all threads share the same slots. In each malloc test, one thread either frees or allocates, with locking required. It may happen that one thread keeps allocating objects which are freed by another thread. In shbench, every thread alternately allocates some "random" new objects and frees some "random" old objects. Except for t-test2, the threads are independent and completely parallel. FIG. 8 Table 2 shows statistics of the six benchmarks for single-threaded and sixteen-threaded runs. The benchmarks show different characteristics in the total object count and the maximal live size (memory consumption). The total object count ranges from 6 million to 5.4 billion, consuming memory from 192 MB to over 1 TB. The maximal live size ranges from 550 to 154 million objects, consuming from 3 MB to 2 GB. The ratio of total objects to maximal live objects ranged between 1 and 9 million. The table also shows that the average object size ranges from 32 bytes to 9 KB. The table further illustrates the effect of concurrency. In all but one program, the number of allocations change depending upon the thread count. linux-scalability allocates 16 times as many objects with 16 threads as it does with one thread. larson allocates fewer objects with 16 threads but the maximal live size is 16 times as large. The variations in the total and live size and in the effect of concurrency show that the six programs cover a wide range of memory allocation behavior.

Tests were run on two newest-generation multicore machines. The first machine had two Intel Haswell Xeon E5-2699 2.30 GHz processors. Each processor had 18 cores each supporting execution of two simultaneous threads (SMT or "hyperthreading"). The first machine thus could simultaneously execute 72 hardware threads. The Linux kernel used was 3.18.7. The second machine had two IBM Power8 4.1 GHz processors. Each processor has 10 cores each supporting execution of eight simultaneous threads (8-way SMT). The second machine thus could simultaneously execute 160 hardware threads. The IBM OS kernel version was 3.15.10.

Cost of Fetch and Return Operations
  Prior Art
  Fetch and return operations require communication between a local heap and the global heap. We first show how expensive the two operations are using existing allocators. FIG. 9 Table 3 shows results collected by running the 6 test programs using 16-thread TCMalloc on the two test machines. Fetch and return operations communicate with the global heap versus allocate and free operations which communicate with the local heap. In the first three columns, the values are calculated versus total time spent in the operations, and in the last two columns versus the average time spent in each type of operation. In nearly half of the tests, fetch and return consume over 30% of the total time spent in the allocator. The highest is 82% by linux-scalability on the Intel processor. The lowest portion are in the three tests of the two programs, t-test1 and threadtest, which show less than 2% total time spent in fetch and return. The average time of allocation and free ranges between 42 ns in threadtest and 102 ns in linux-scalability on the Intel processor. The times on the IBM processor are almost identical, just 1 ns to 1.4 ns faster. The costs of fetch and return show a much greater variation from program to program. The last two columns of Table 3 show that the average time of a fetch or return is 27 (t-test2 on IBM) to 7800 (threadtest on Intel) times the average time of allocation and free, varying by more than two orders of magnitude.

In each program, the relative costs of fetches and returns are higher on the Haswell processors than on the Power8 processors. Part of the reason is that four of the programs run much faster on the Haswell processors than on the Power8 processors. But the improvement in speed of execution does not reduce the cost of heap operations as effectively. Fetch and return operations take 53% of allocator time on Haswell, compared to 31% on Power8. The remaining two programs run faster and still show a lower relative cost on Power8, suggesting that that processor is much faster for fetch and return operations. This is confirmed by Power8's much lower ratios in the last two columns: threadtest has the largest ratios, and the two Haswell ratios are 3 times the magnitude of the Power8 ratios. Regardless of platform, the ratios confirm that fetches and returns are many times more costly than allocations and frees, and the exact cost varies by two orders of magnitude in different programs. The large magnitude and variation of their costs encourage regulation of fetch and return operations.

Figure 10:
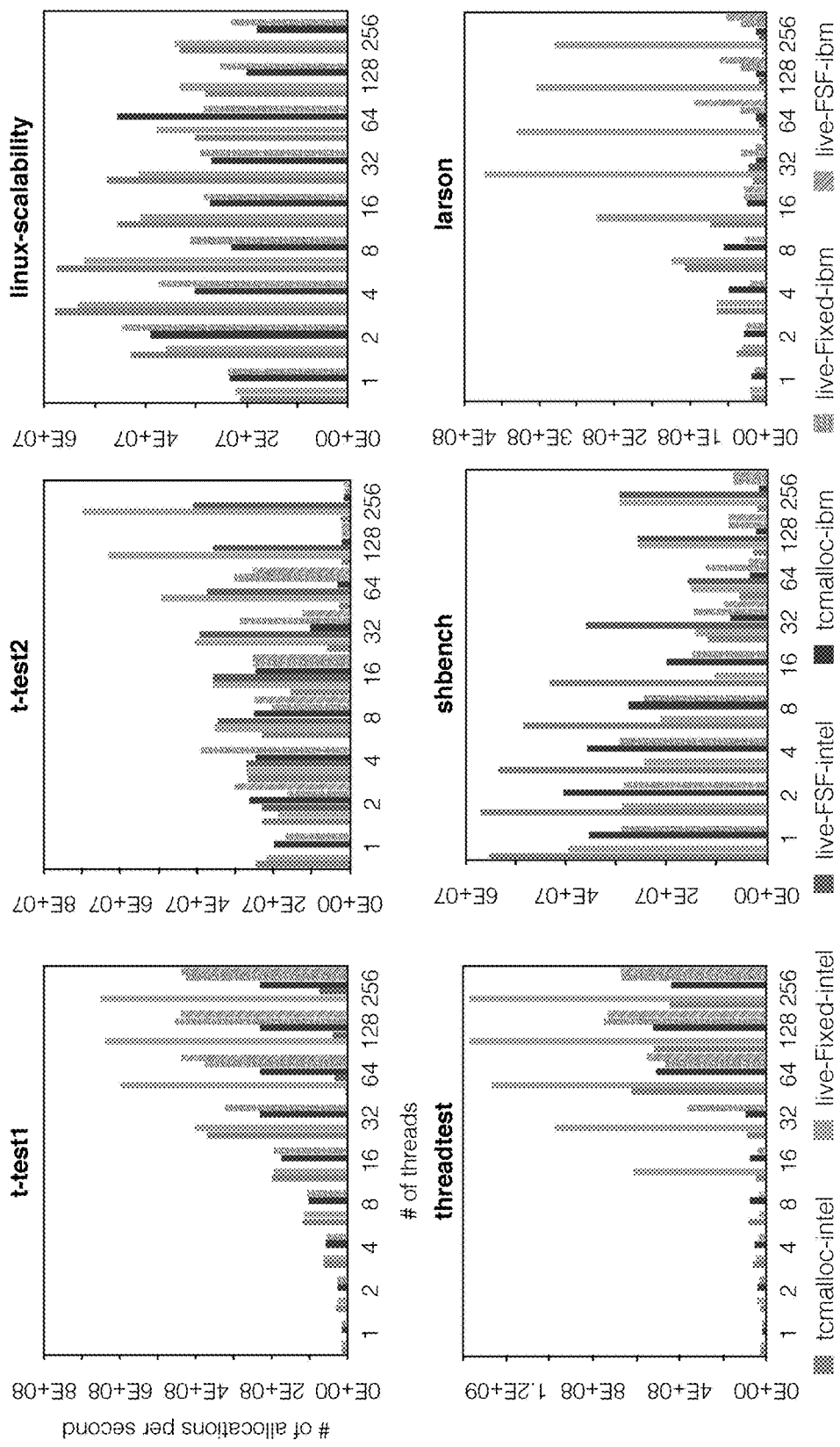
FIG. 10 is a set of graphed benchmark test results comparing the performance of the present allocator to TCMalloc for runs of the (a) t-test1, (b) t-test2, (c) linux-scalability, (d) threadtest, (e) shbench, and (f) larson tests.
Figure 11A:
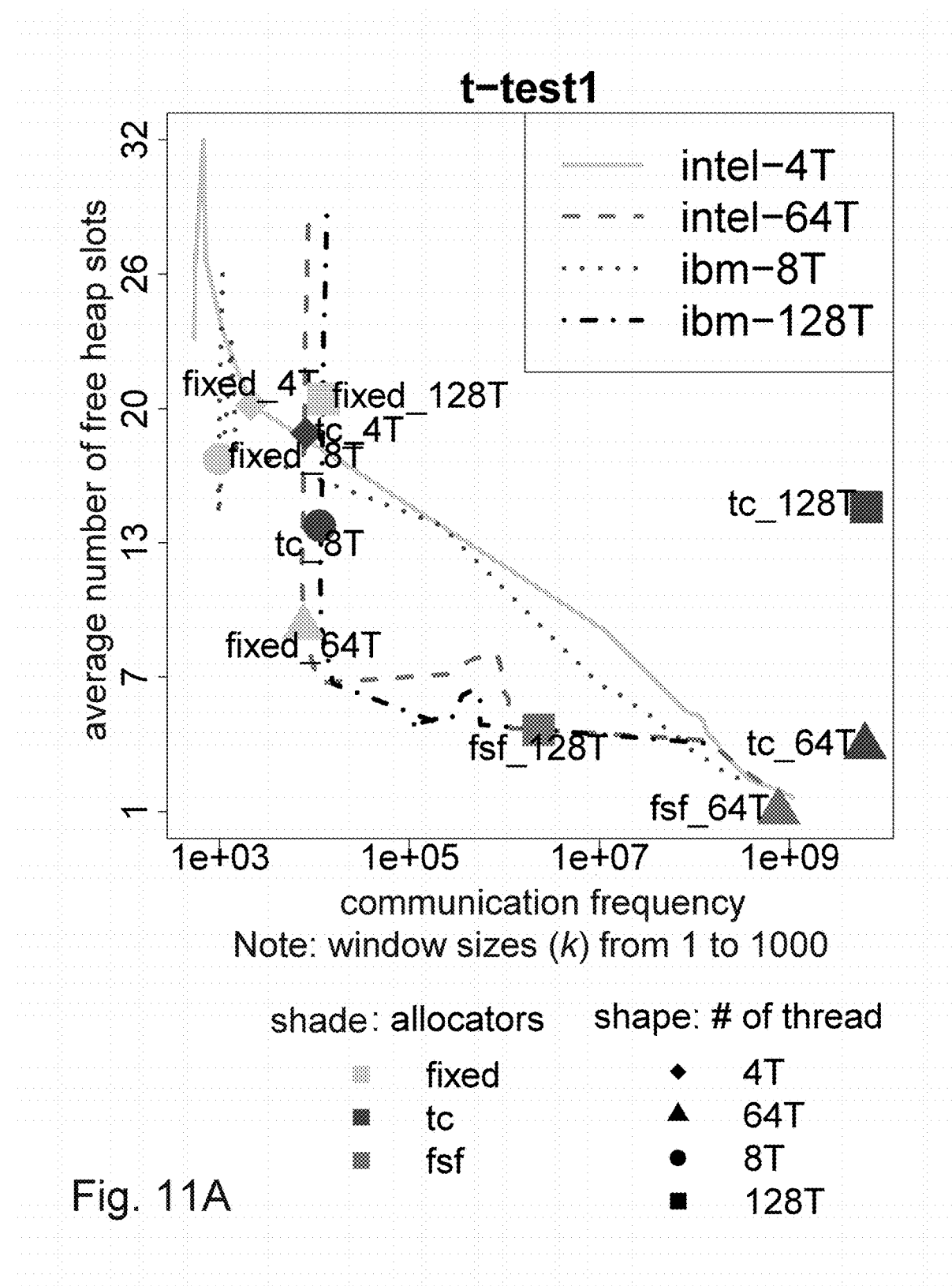
FIGS. 11A-F are a set of graphed benchmark test results comparing the performance of the present allocator for different parameter values during runs of the (a) t-test1, (b) t-test2, (c) linux-scalability, (d) threadtest, (e) shbench, and (f) larson tests.
Figure 11B:
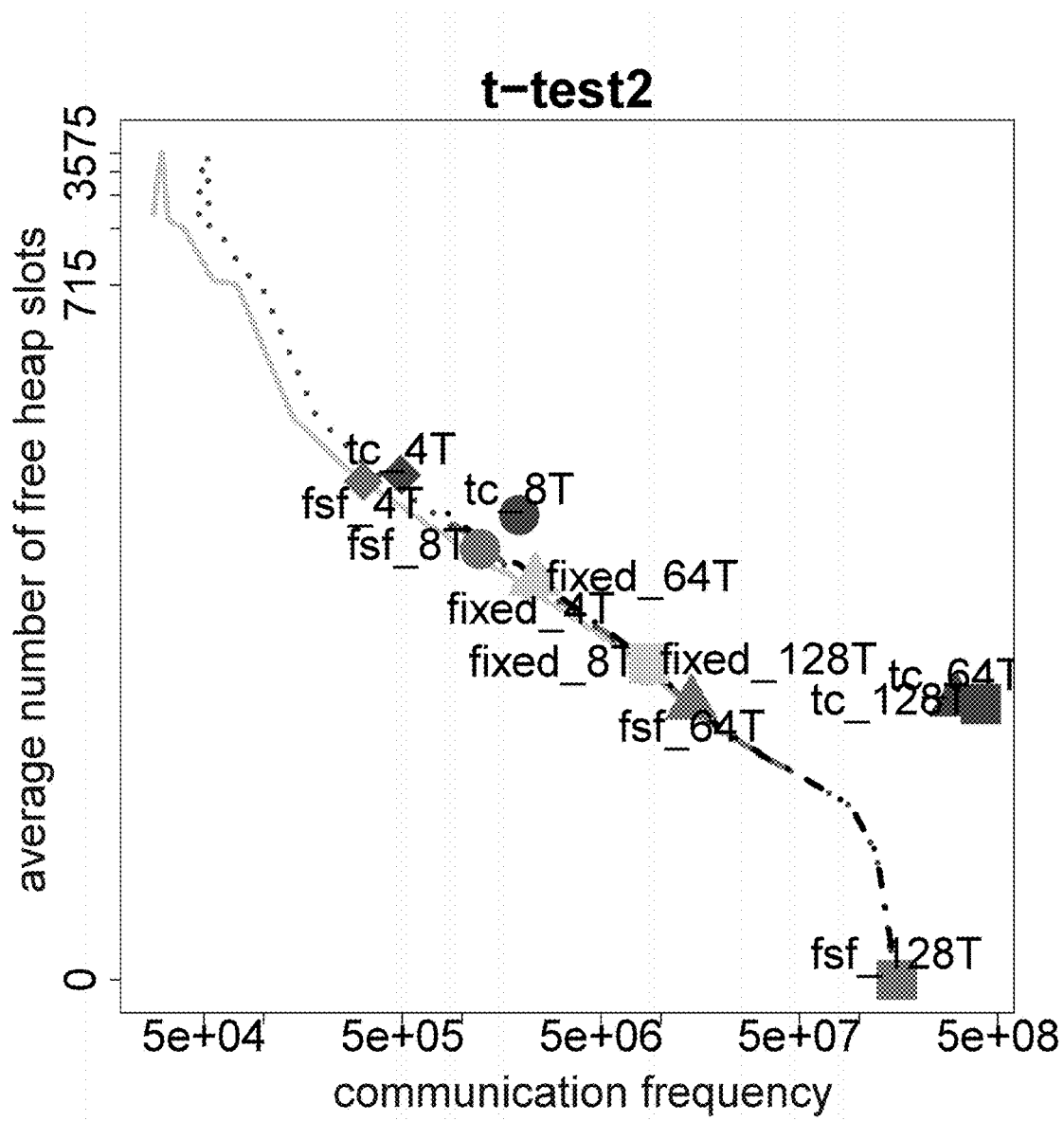
Figure 11C:
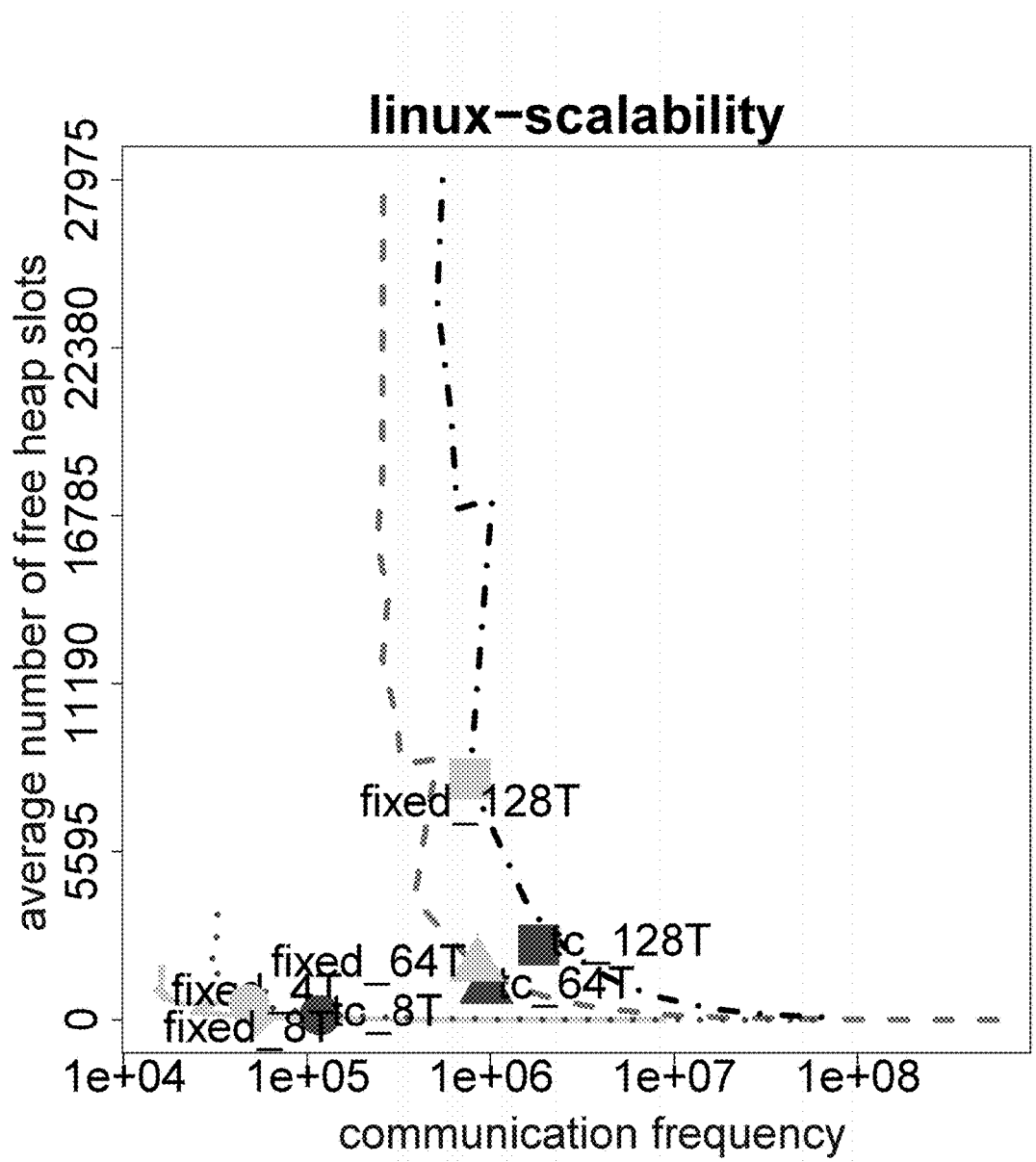
Figure 11D:
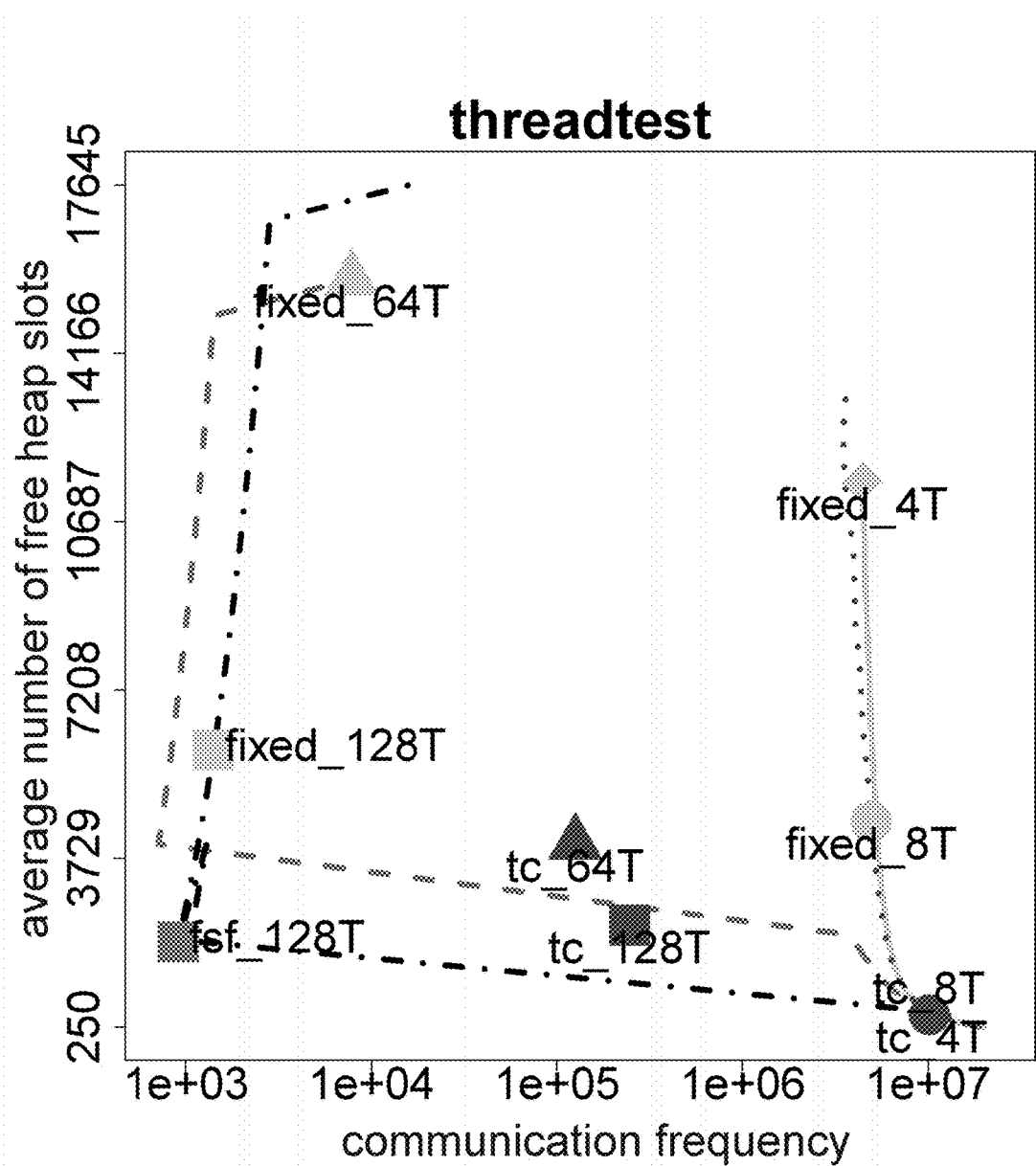
Figure 11E:
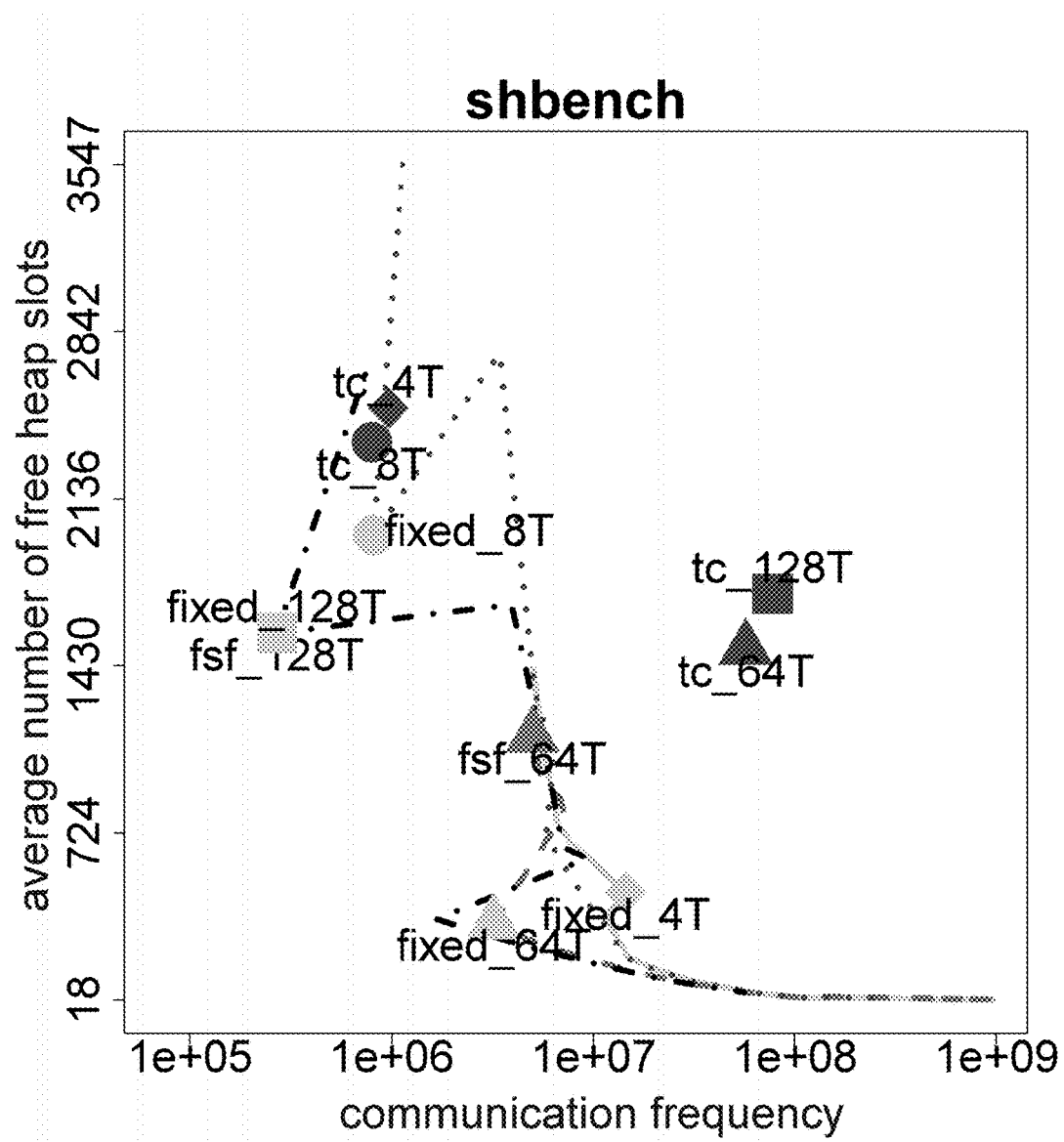
Figure 11F:
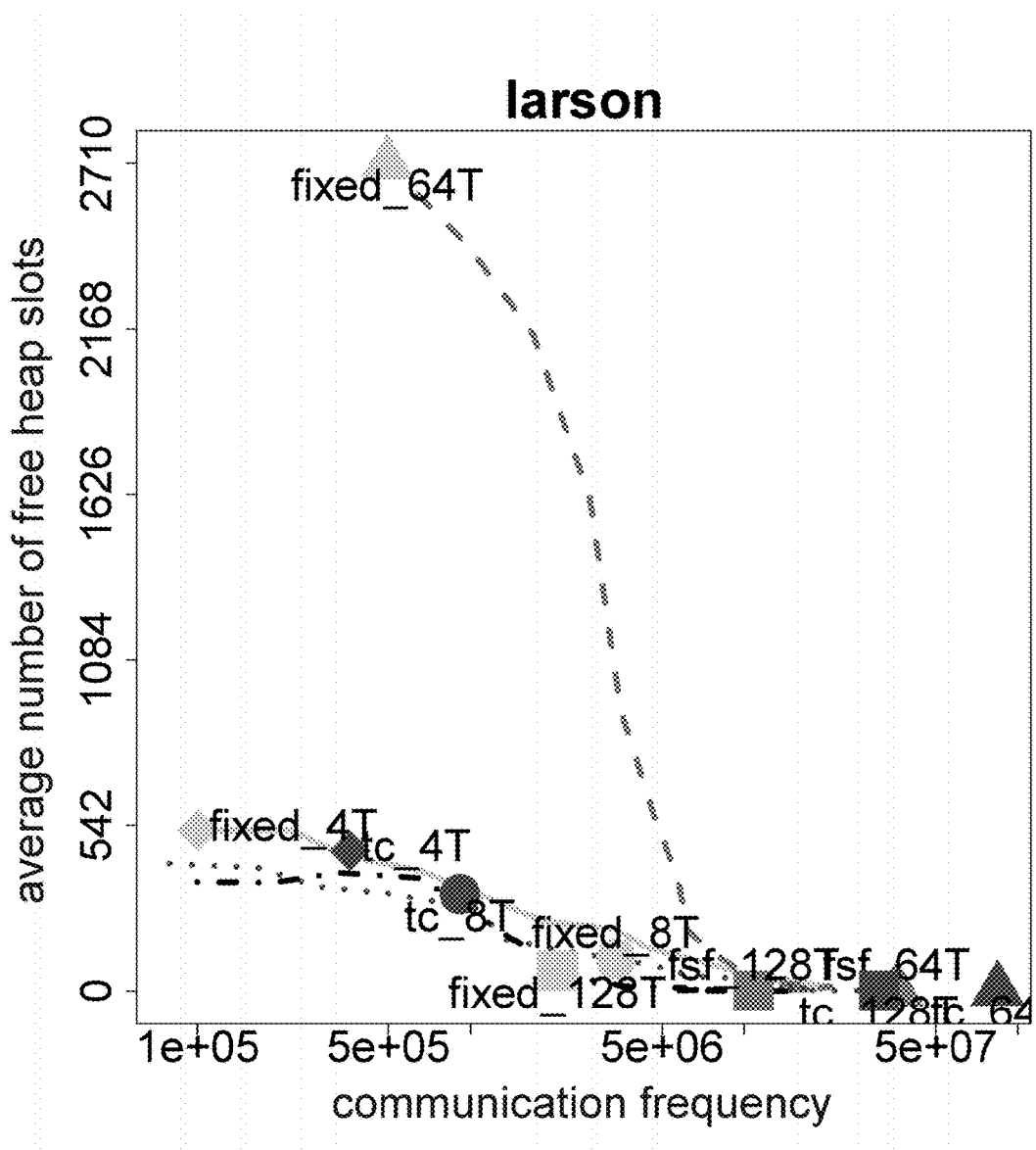

New Allocator
  FIG. 10 illustrates comparative performance between the Live allocator and TCMalloc on Haswell and Power8 with nine power-of-two thread counts from 1 to 256. The Live result changes depending on the value of the parameter 110 or k, i.e., the selected number of allocations per fetch (APF). We illustrate two results. The first uses target APF values, with adaptive control, selected to give uniformly better results than TCMalloc for each thread count, a so-called FSF value ("Faster running time, Smaller memory usage, and Fewer communications"). Where multiple FSF values exist, the one producing the highest throughput (allocations per second) was used. These results are labeled "live-FSF-intel" and "live-FSF-ibm." Also, for a more even-handed comparison, the second uses fixed APF values, selected from the APF values with the best and most scalable performance on large thread counts. The speedup of FSF ranges from 1:02× to 17× over TCMalloc. Over half of the test results are over a 2× speedup, 30% are more than a 4× speedup, and over 10% are more than a 10× speedup. The greatest FSF speedup, 17:29×, is t-test2 with 256 threads on Haswell. 67 of the 108 tests have no FSF result, including all linux-scalability on Haswell and Power8 and all threadtest on Haswell. In these cases, the Live allocator can still improve performance, reduce memory consumption, or reduce communication frequency, but not all three at the same time. FSF results happen more often in large thread counts, except for t-test2 which has FSF results in all but single-thread runs. The fixed APF variant of Live offers superior performance on large thread counts. For runs with 8 or fewer threads, performance ranges from 0:42× to 1:52× of TCMalloc, with over 70% of runs slower than TCMalloc. However, for runs with 16 or more threads, Live is at least 1:5× faster for over 60% of the tests and 4× faster for half of the tests.

In five tests of two programs, larson and t-test1, with large thread counts on Haswell, we observe more than 100× and as high as 154× speedup over TCMalloc. These are not FSF results, which means that Live trades off memory for (a lot higher) speed. In addition, the fixed APF variant performs much better for large thread counts than for small thread counts, showing that there is still no one-size-fits-all solution. A single, default configuration cannot be the best for all programs, and in the case of high concurrency, it can have pathologically bad performance for all programs. But for applications which spend much time inside memory allocators, e.g. t-test2, these results show the benefits of a single-parameter-tunable allocator. The Live allocator provides such a single parameter. Therefore, it is easy to tune as well as offering superior performance.

Performance Versus Memory Efficiency and Potential for Contention

FIGS. 11A-E illustrate the performance of Live, over a range of APF values for parameter 110, versus that of TCMalloc. Performance is evaluated over two dimensions: the average free list length, a.k.a. memory efficiency (y-axis), and the frequency of transfer operations, a.k.a., communication frequency (x-axis). Better performance is represented by closer proximity to the lower left corner. For Live, between 1,000 and 19,000 APF values were evaluated on both machines. The exact ranges are given in the captions to the subparts of the figures. Results, ordered by APF value, are connected by lines in order to appear as curves.

The resultant curves all generally progress from upper left to lower right. This behavior shows that these APF values cover the efficiency-communication tradeoff in an orderly procession, from low communication and high memory usage to high communication and low memory usage. The fact that the results form curves and not randomly directed lines shows the soundness of liveness in theory and the usefulness of single-parameter tuning in practice. In four tests, the Live curve is to the lower left of the TCMalloc results, marked by "tc" points referring to the number of threads used. These four figures show that Live may be used with many parameter values to give FSF results. In two other tests, linux-scalability and larson, the "tc" points are basically on the Live curves or outside their range. linux-scalability has frequently interleaved allocations and frees. [[verify versus papter, which says tcmalloc] larson uses a slow start heuristic, which first tries to fetch a small amount of memory and gradually increases the size of the fetch as needed. Results for the parameter values illustrated in FIG. 10 as FSF results are marked as "FSF" points, e.g., "FSF_64T", and results for the fixed parameter values illustrated in FIG. 10 as "fixed" points, e.g., "fixed_64T." linux-scalability has frequently interleaved allocations and frees. uses a slow start heuristic, which first tries to fetch a small amount of memory and gradually increases the size of fetch as needed. This design fits well with TCMalloc, which is why it is comparable with Live for this test.

Performance Versus Optimal Solution and Other Allocators

Figure 12:
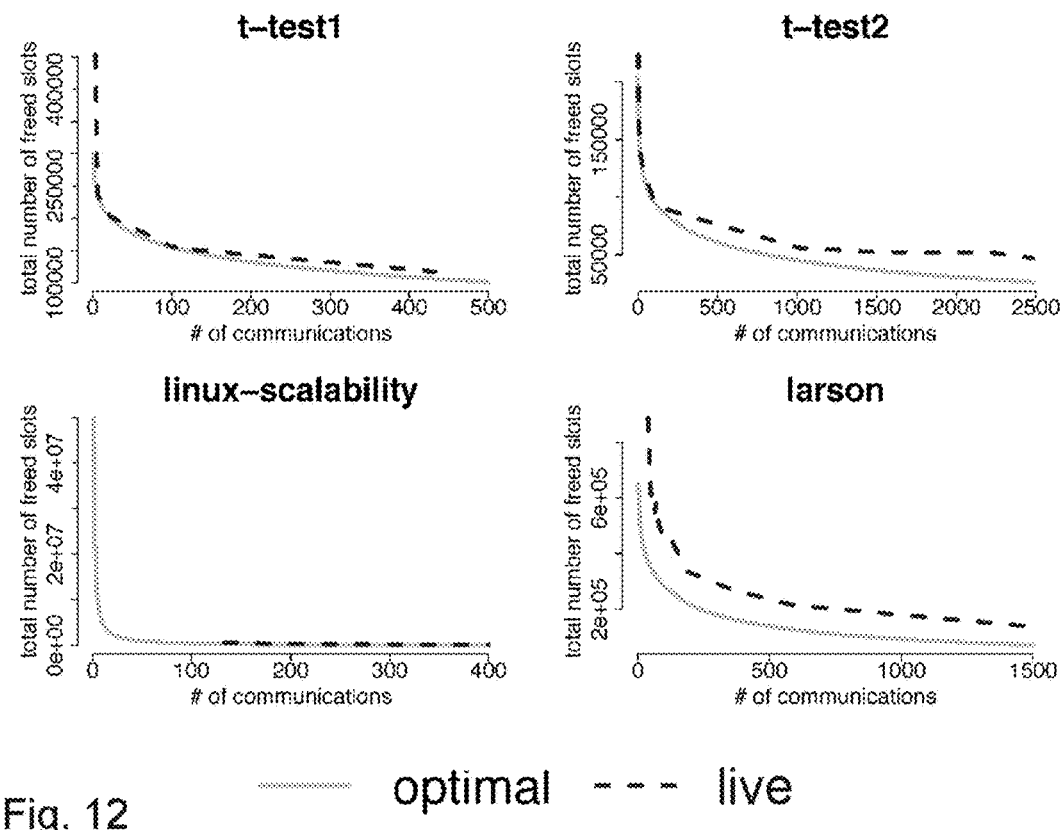
FIG. 12 is a set of graphed benchmark test results comparing the performance of the present allocator to an optimal solution described herein.

FIG. 12 displays the results of trials of Live versus results predicted from the optimal solution. Four programs were traced for allocations of every size classes. The illustrated comparison is for a single representative size class of a program. Note that because time complexity of the optimal solution is $O(n^3)$, where is total number of allocations, the input sizes are smaller than in the performance tests of the prior section. As a data point, it currently takes 27 hours to compute the optimal solution for a history including n=45000 allocations. However, the programs are relatively steady state in their behavior, so that the smaller input size should not hurt the comparison. For t-test1 and linux-scalability, the performance of Live is almost identical to that of the optimal solution. However, recall that TCMalloc and Live have similar performance in these two tests as well. The reason then is that both methods are near optimal. In t-test2, the gap between the two curves grows with a greater communication frequency. In larson, the gap between two curves appears to stay constant. In all cases, Live has the same trend as the optimal solution. This strongly validates the operational theory behind the allocator 100 and shows that APF tuning is able in most cases to optimize memory allocation.

Figure 13:
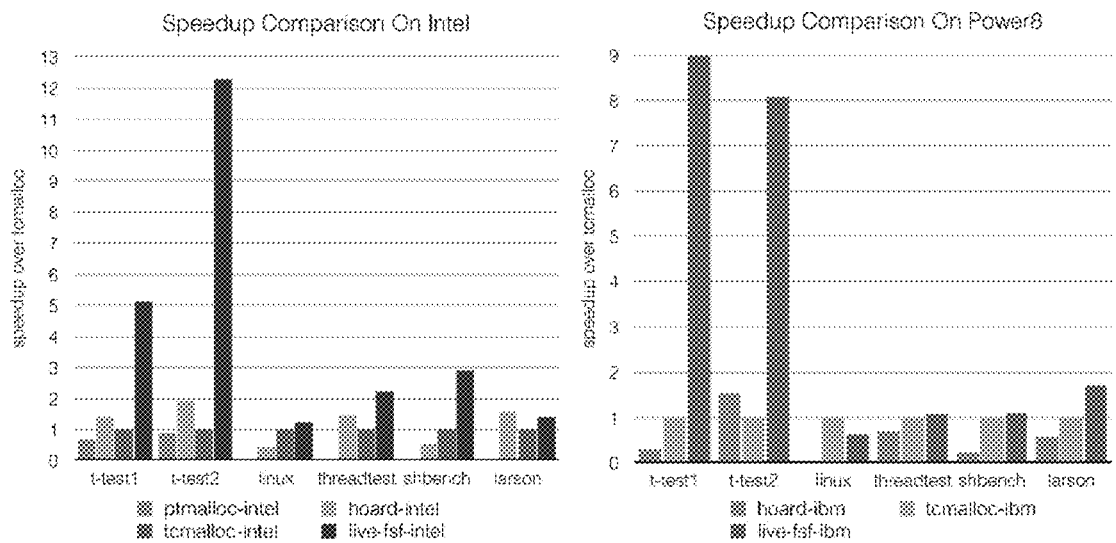
FIG. 13 is a set of graphed benchmark test results comparing the performance of the present allocator to TCMalloc, PMalloc, and Horde for runs of the t-test1, t-test2, linux_scalability, threadtest, shbench, and larson tests on Haswell and Power8 architecture systems.

FIG. 13 displays the results of trials of Live, TCMalloc, PTMalloc, and Hoard in which the performance of TCMalloc is used as a relative baseline. On the Haswell-based test system, liveness based allocation provides a 4.19× speedup compared with 0:26× for PTMalloc and 1:22× for Hoard. On the Power8-based test system, liveness based allocation provides a 3.75× speedup compared with 0.56× for Hoard. The liveness-based allocator is consistently good. Hoard behaves better on Haswell, but worse on Power8 in comparison to TCMalloc. A reason is the lower overhead of Live, even when using adaptive control. TCMalloc often has worse performance than Live because it can spend a large amount of time calculating heuristics, especially when the thread count is high. We have observed that the heuristic functions in TCMalloc cost significant amounts of time in several tests, for example, the garbage collection function Scavenge( ). When there is a lack of memory, one thread tends to steal memory slots from other threads' private heaps. This may trigger a chain reaction when the stolen-from thread has to steal the slots back. The resultant behavior creates a time-consuming loop inside the allocator. This example shows the weakness of heuristic-based solutions, as well as the difficulty novices face when attempting to tune performance in existing allocators.

CONCLUSION

The disclosure presents a new approach for highly parallel memory allocation. We have presented efficient algorithms for the offline measurement of multi-timescale heap reuse and population of live objects, a simpler and faster solution for the online measurement of liveness using incremental algorithms and samples, and the estimation of a reserve. We also presented methods for adaptive control and performance evaluation in comparison to an offline optimal solution. Testing of allocator across a large parameter space and comparison with optimal results have shown that the allocator enables proper tuning using a single control parameter and is theoretically sound. Performance improvements versus prior art allocators, up to 17 times while using less memory and up to 154 times when trading memory for speed, show the potential of liveness based allocation to improve the performance of parallel computing systems when placed into practical use.

The claims can encompass embodiments in hardware, software, or a combination thereof. It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

REFERENCES

[1] E. D. Berger, K. S. McKinley, R. D. Blumofe, and P. R. Wilson. *Hoard: a scalable memory allocator for multi-threaded applications*. In Proceedings of ASPLOS, pages 117-128, 2000.
[2] Google. Tcmalloc: a memory allocator. http://googperftools.sourceforge.net/doc/tcmalloc.html.
[3] D. Lea. A memory allocator. http://gee.cs.oswego.edu/dl/html/malloc.html.
[4] Google. Gperftools. https://code.google.com/p/gperftools/source/browse/src/tests/ptmalloc/?name=perftools-0.1
[5] P. Li and C. Ding. *All-window data liveness*. In Proceedings of the ACM SIGPLAN Workshop on Memory Systems Performance and Correctness, 2013.
[6] P. Li, C. Ding, and H. Luo. *Modeling heap data growth using average liveness*. In Proceedings of ISMM, 2014.
[7] S. Lee, T. Johnson, and E. Raman. *Feedback directed optimization of tcmalloc*. In Proceedings of the Workshop on Memory Systems Performance and Correctness, 2014.

APPENDIX

C language implementation of optimal solution algorithm

```
void optffmm(int total_allocations, int sc)
{
    /**
     * total time length: trace starts from 0 to value of time
     * value of time in fact denotes how many objects are allocated.
     * time : # of bars
     */
    int time = total_allocations;
    /**
     * gap[i][j] : memory cost of using i segments to cover from
     * 1-th bar to j-th bar.
     * i : 0 to N
     * j : 1 to N
     */
    int *gap = (int *)malloc(sizeof(int) * (time+1) * (time+1));
    memset(gap, 0, (sizeof(int) * (time+1) * (time+1)) );
    /**
     * one_gap[i][j] : memory cost of using one segment to cover from
     * i-th bar to j-th bar.
     * i : 1 to N
     * j : 1 to N
     */
    int *one_gap = (int *)malloc(sizeof(int) * (time+1) * (time+1));
    memset(one_gap, 0, (sizeof(int) * (time+1) * (time+1)) );
    int i, j, k;
    /**
     * init_gap_with_zeros
     * gap[i][j] = 0 iff i >= j
     * do nothing in C programs
     */
    /**
     * init_zero_column
     * gap[0][j] = inf, when j = 1 to N
     */
    for (j=1; j<=time; j++) {
        gap[j] = 2147483647;
    }
    /**
     * init_one_gap
     * one_gap[i][j] = 0
     * do nothing in C programs
     */
    /**
     * compute_one_gap
     */
```

APPENDIX-continued

C language implementation of optimal solution algorithm

```
    int max_v;
    for (i=1; i<=time; i++) {
        one_gap[1*(time+1)+i] = 0;
        max_v = live[sc][i];
        for (j=i+1; j<=time; j++) {
            if ( live[sc][j] > max_v ) {
                one_gap[1*(time+1)+j] =
  one_gap[1*(time+1)+(j-1)] + (j-1 - i + 1) * (live[sc][j] - max_v);
                max_v = live[sc][j];
            }
            else {
                one_gap[i*(time+1) + j] = one_gap[1*(time+1) +
(j-1)] + (max_v - live[sc][j]);
            }
        }
    }
    /**
     * init_first_column
     */
    for (j = 1; j<=time; j++) {
        gap[1*(time+1) + j] = one_gap[1*(time+1) + j];
    }
    /**
     * dynamic programming to compute gap costs
     * O(time length)
     */
    int min_v;
    for (i=2; i<=time; i++) {
        for (j=i+1; j<=time; j++) {
            min_v = gap[(i-1)*(time+1) + (i-1)] +
one_gap[i*(time+1) + j];
            for (k=i; k<=j-1; k++) {
                if ( min_v > gap[(i-1)*(time+1)+k] +
one_gap[(k+1)*(time+1) +j] )
                    min_v = gap[(i-1)*(time+1)+k] +
one_gap[(k+1)*(time+1)+j];
            }
            gap[1*(time+1) + j] = min_v;
        }
    }
    /**
     * dump results
     */
    char out_buf[1024] = {'\0'};
    sprintf(out_buf, "out_%d.asc", sc);
    FILE *out = fopen(out_buf, "wb");
    for (i=1; i<=time; i++) {
        fprintf(out, "%d\t%d\n", i, gap[i*(time+1) + time]);
    }
    fclose(out);
    free(gap);
    free(one_gap);
}
```

The invention claimed is:

1. A non-transitory, computer readable storage medium encoding a memory allocation module, the memory allocation module including instructions executable by a processor unit to perform:
    (1) receiving a parameter representing a length of a thread execution window from an invoking thread;
    (2) calculating a liveness metric for the invoking thread, the liveness metric representing heap slot reuse or a number of live data objects within the thread execution window, based upon the parameter;
    (3) calculating a reserve of memory to be provided to the invoking thread based upon the parameter and the liveness metric; and
    (4) returning a pointer to an allocation of memory corresponding to the calculated reserve of memory, the allocation containing one or more chunks of memory that can be traversed via the pointer, whereby a program thread invoking the memory allocation module is provided with an allocation of memory including a reserve of free heap slots beyond the immediate requirements of the invoking thread.

2. The storage medium of claim 1, wherein the liveness metric represents, for a time window with a length specified by the parameter, the average number of times that local heap slots which were holding live objects at the start of the time window were freed and then allocated to hold new objects within the span of the time window, for multiple possible windows of the length.

3. The storage medium of claim 1, wherein the liveness metric is calculated according to:

$$\text{reuse}(k) = \frac{\sum_{i=1}^{m} I(e_i - s_i \leq k)(\min(n-k, s_i) - \max(k, e_i) + k + 1)}{n - k + 1},$$

where k is the parameter,
where $s_i$ and $e_i$ are a time interval logical start time and end time, respectively, during an i one of m free intervals in which a thread-local heap slot is free, unallocated, and unoccupied,
where n is the current logical time, and
where function I is a predicate equal to 1 if the condition $(e_i - s_i \leq k)$ is true or else 0.

4. The storage medium of claim 1, wherein the liveness metric is calculated according to:

$$\text{reuse}(k) = \frac{X(k) - Y(k) + Z(k)}{n - k + 1}$$

where $X(1) = \Sigma_{i=1}^{m} I(e_i - s_i = 1) s_i$ $X(k) = X(k-1) - \Sigma_{i=1}^{m} I(s_i \geq n - (k-1)) + \Sigma_{i=1}^{m} I(e_i - s_i = k) \min(n-k, s_i)$, for $k > 1$ $Y(1) = \Sigma_{i=1}^{m} I(e_i - s_i = 1) e_i$ $Y(k) = Y(k-1) - \Sigma_{i=1}^{m} I(e_i \leq k-1) + \Sigma_{i=1}^{m} I(e_i - s_i = k) \max(k, e_i)$, for $k > 1$ $Z(1) = 2\Sigma_{i=1}^{m} I(e_i - s_i = 1)$ $Z(k) = Z(k-1) + \Sigma_{i=1}^{m} I(e_i - s_i \leq k) + k \Sigma_{i=1}^{m} I(e_i - s_i = k)$, for $k > 1$ where k is the parameter,
where $s_i$ and $e_i$ are a time interval logical start time and end time, respectively, during an i one of m free intervals in which a thread-local heap slot is free, unallocated, and unoccupied,
where n is the current logical time, and
where function I is a predicate equal to 1 if the respective parenthetical condition is true or else 0.

5. The storage medium of claim 4, wherein the liveness metric is calculated during a plurality of burst periods, each burst period being separated from a next-in-time burst period by a hibernation period.

6. The storage medium of claim 1, wherein the liveness metric represents, for a time window with a length specified by the parameter, the number of live objects in a local heap existing within the time window plus the number of objects in the local heap newly allocated within the time window, averaged over multiple possible windows of the length.

7. The storage medium of claim 1, wherein the liveness metric is calculated according to:

$$\text{live}(k) = \frac{\sum_{i=1}^{m} \min(n-k+1, e_i) - \sum_{i=1}^{m} \max(k, s_i) + mk}{n - k + 1}$$

where k is the parameter,
where $s_i$ and $e_i$ are a time interval logical start time and end time, respectively, during an i one of m free intervals in which a thread-local heap slot is free, unallocated, and unoccupied, and
where n is the current logical time.

8. The storage medium of claim 1, wherein the liveness metric is calculated according to:

$$\text{live}(1) = \frac{\sum_{i=1}^{m} e_i - \sum_{i=1}^{m} s_i + m}{n} \text{ and}$$

$\text{live}(k > 1) =$ $$\frac{n \times \text{live}(1)}{n-k+1} - \frac{\text{cumu\_deallocations}(n-k+2) + \text{cumu\_allocations}(k-1)}{n-k+1}$$

where $\text{cumu\_allocations}(k) = \Sigma_{i=1}^{m} I(s_i \leq k)$ and $\text{cumu\_deallocations}(k) = \Sigma_{i=1}^{m} I(e_i \geq k)$ where k is the parameter,
where $s_i$ and $e_i$ are a time interval logical start time and end time, respectively, during an i one of m free intervals in which a thread-local heap slot is free, unallocated, and unoccupied, and
where n is the current logical time.

9. The storage medium of claim 1, wherein the liveness metric is calculated according to:

$$\text{live}(n, k) = \frac{\sum e_{n-k+1} + (m - \#e_{n-k+1})(n-k+1) - (\#s_k k - \sum s_n - \sum s_k) + mk}{n - k + 1}$$

where k is the parameter,
where $\Sigma e_k$ is the sum of free times before time k,
where $\#e_k$ is the number of frees before time k,
where $\Sigma s_k$ is the sum of allocation times before k,
where $\#s_k$ is the number of allocations before time k, and
where m is the number of currently allocated objects at time n.

10. A computer system comprising:
a processor unit;
a memory for the storage of executable program code and data; and
a memory allocation module stored in the memory for execution by the processor unit, the memory allocation module containing executable instructions to carry out:
(1) receiving a parameter representing a length of a thread execution window from an invoking thread;
(2) calculating a liveness metric for the invoking thread, the liveness metric representing heap slot reuse or a number of live data objects within the thread execution window, based upon the parameter;

(3) calculating a reserve of memory to be provided to the invoking thread based upon the parameter and the liveness metric; and (4) returning a pointer to an allocation of memory corresponding to the calculated reserve of memory, the allocation containing one or more chunks of memory that can be traversed via the pointer, whereby a program thread invoking the memory allocation module is provided with an allocation of memory including a reserve of free heap slots beyond the immediate requirements of the invoking thread.

11. The computer system of claim 10, wherein the liveness metric represents, for a time window with a length specified by the parameter, the average number of times that local heap slots which were holding live objects at the start of the time window were freed and then allocated to hold new objects within the span of the time window, for multiple possible windows of the length.

12. The computer system of claim 10, wherein the liveness metric is calculated according to:

$$\text{reuse}(k) = \frac{\sum_{i=1}^{m} I(e_i - s_i \leq k)(\min(n-k, s_i) - \max(k, e_i) + k + 1)}{n - k + 1},$$

where k is the parameter, where $s_i$ and $e_i$ are a time interval logical start time and end time, respectively, during an i one of m free intervals in which a thread-local heap slot is free, unallocated, and unoccupied, where n is the current logical time, and where function I is a predicate equal to 1 if the condition $(e_i - s_i \leq k)$ is true or else 0.

13. The computer storage medium of claim 10, wherein the liveness metric is calculated according to:

$$\text{reuse}(k) = \frac{X(k) - Y(k) + Z(k)}{n - k + 1}$$

where $X(1) = \sum_{i=1}^{m} I(e_i - s_i = 1) s_i$ $X(k) = X(k-1) - \sum_{i=1}^{m} I(s_i \geq n-(k-1)) + \sum_{i=1}^{m} I(e_i - s_i = k) \min(n-k, s_i)$, for $k > 1$ $Y(1) = \sum_{i=1}^{m} I(e_i - s_i = 1) e_i$ $Y(k) = Y(k-1) - \sum_{i=1}^{m} I(e_i \leq k-1) + \sum_{i=1}^{m} I(e_i - s_i = k) \max(k, e_i)$, for $k > 1$ $Z(1) = 2 \sum_{i=1}^{m} I(e_i - s_i = 1)$ $Z(k) = Z(k-1) + \sum_{i=1}^{m} I(e_i - s_i \leq k) + k \sum_{i=1}^{m} I(e_i - s_i = k)$, for $k > 1$ where k is the parameter, where $s_i$ and $e_i$ are a time interval logical start time and end time, respectively, during an i one of m free intervals in which a thread-local heap slot is free, unallocated, and unoccupied, where n is the current logical time, and where function I is a predicate equal to 1 if the respective parenthetical condition is true or else 0.

14. The computer storage medium of any of claim 13, wherein the liveness metric is calculated during a plurality of burst periods, each burst period being separated from a next-in-time burst period by a hibernation period.

15. The computer of claim 10, wherein the liveness metric represents, for a time window with a length specified by the parameter, the number of live objects in local heaps existing but not feed within the time window plus the number of objects in local heaps newly allocated within the time window, averaged over multiple possible windows of the length.

16. The computer system of claim 10, wherein the liveness metric is calculated according to:

$$\text{live}(k) = \frac{\sum_{i=1}^{m} \left( \min(n - k + 1, e_i) - \sum_{i=1}^{m} \max(k, s_i) + mk \right)}{n - k + 1}$$

where k is the parameter, where $s_i$ and $e_i$ are a time interval logical start time and end time, respectively, during an i one of m free intervals in which a thread-local heap slot is free, unallocated, and unoccupied, and where n is the current logical time.

17. The computer system of claim 10, wherein the liveness metric is calculated according to:

$$\text{live}(1) = \frac{\sum_{i=1}^{m} e_i - \sum_{i=1}^{m} s_i + m}{n} \text{ and}$$

$$\text{live}(k > 1) = \frac{n \times \text{live}(1)}{n - k + 1} - \frac{\text{cumu\_deallocations}(n - k + 2) + \text{cumu\_allocations}(k - 1)}{n - k + 1}$$

where $\text{cumu\_allocations}(k) = \sum_{i=1}^{m} I(s_i \leq k)$ and $\text{cumu\_deallocations}(k) = \sum_{i=1}^{m} I(e_i \geq k)$ where k is the parameter, where $s_i$ and $e_i$ are a time interval logical start time and end time, respectively, during an i one of m free intervals in which a thread-local heap slot is free, unallocated, and unoccupied, and where n is the current logical time.

18. The computer system of claim 10, wherein the liveness metric is calculated according to:

$$\text{live}(n, k) = \frac{\sum e_{n-k+1} + (m - \#e_{n-k+1})(n - k + 1) - (\#s_k k - \sum s_n - \sum s_k) + mk}{n - k + 1}$$

where k is the parameter, where $\Sigma e_k$ is the sum of free times before time k, where $\#e_k$ is the number of frees before time k, where $\Sigma s_k$ is the sum of allocation times before k, where $\#s_k$ is the number of allocations before time k, and where m is the number of currently allocated objects at time n.

19. A method of adaptively controlling the memory allocation module of claim 10, the method comprising:

setting the parameter equal to a target time interval between invocations of the memory allocation module to request memory;

invoking memory allocation module to fetch a memory allocation based upon the parameter;

setting the parameter equal to an adaptive time interval to be sought before a next fetch operation whereby, if correctly predictive of the time of the next fetch operation, a long term average time interval between fetch operations approaches the target time interval; and reinvoking the memory allocation module to fetch a memory allocation based upon the adaptive-time-interval-valued parameter.

20. The method of claim 19 further comprising:

upon an local free operation, checking whether the length of a local heap free list is greater than twice the calculated reserve of memory; and if the check is true, invoking the memory allocation module to return free heap slots from the local heap.

* * * * *